(12) United States Patent
Endoh et al.

(10) Patent No.: US 8,984,426 B2
(45) Date of Patent: Mar. 17, 2015

(54) SCREEN EDITING APPARATUS, SCREEN EDITING METHOD AND COMPUTER-READABLE INFORMATION RECORDING MEDIUM

(75) Inventors: Tsuyoshi Endoh, Kanagawa (JP); Toru Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1206 days.

(21) Appl. No.: 12/470,688

(22) Filed: May 22, 2009

(65) Prior Publication Data
US 2009/0300529 A1 Dec. 3, 2009

(30) Foreign Application Priority Data

May 29, 2008 (JP) .................. 2008-140776

(51) Int. Cl.
*G06F 3/00* (2006.01)
*H04N 1/00* (2006.01)
*G06F 9/44* (2006.01)
*G06F 9/445* (2006.01)

(52) U.S. Cl.
CPC .......... *H04N 1/00416* (2013.01); *G06F 9/4443* (2013.01); *G06F 9/44505* (2013.01); *H04N 1/00411* (2013.01); *H04N 1/00413* (2013.01); *H04N 1/00432* (2013.01); *H04N 1/00474* (2013.01); *H04N 1/0048* (2013.01); *H04N 1/00482* (2013.01); *H04N 1/00503* (2013.01); *H04N 1/00509* (2013.01)
USPC ............................ 715/764; 715/825; 715/810

(58) Field of Classification Search
CPC ........................... G06F 9/4443; G06F 9/45505

USPC .................. 345/156–184; 715/764, 810, 825
See application file for complete search history.

(56) References Cited

U.S. PATENT DOCUMENTS

| 7,036,084 | B2 | 4/2006 | Miwa et al. | |
|---|---|---|---|---|
| 2002/0099456 | A1* | 7/2002 | McLean | 700/83 |
| 2004/0024744 | A1* | 2/2004 | Yamada | 707/1 |

(Continued)

FOREIGN PATENT DOCUMENTS

| JP | 7-295777 | 11/1995 |
|---|---|---|
| JP | 2003-005825 | 1/2003 |

(Continued)

OTHER PUBLICATIONS

Extended European Search Report.

(Continued)

*Primary Examiner* — Ryan Pitaro
(74) *Attorney, Agent, or Firm* — IPUSA, PLLC

(57) ABSTRACT

For prescribing a state of a selection operating part having options disposed on an operating page displayed, a type attribute of the selection operating part, a display attribute of displaying or not displaying an operating part corresponding to each option of the selection operating part, and priority setting information indicating modification of setting of an option of the selection operating part, are stored, the modification being carried out while the operating page is displayed. In response to a user's operation, a selected or non-selected state of an operating part of each option, or a display attribute may be changed. When a display attribute of an option is changed, information corresponding to a type of the selection operating part having the option and a selected or non-selected state of the operating part having the option is registered as the priority setting information.

12 Claims, 25 Drawing Sheets

(56) References Cited

U.S. PATENT DOCUMENTS

| | | | |
|---|---|---|---|
| 2005/0220349 A1* | 10/2005 | Furuya et al. | 382/195 |
| 2006/0164675 A1 | 7/2006 | Yamada et al. | |
| 2006/0288295 A1* | 12/2006 | Fujita et al. | 715/733 |
| 2007/0143696 A1* | 6/2007 | McComber | 715/764 |
| 2008/0155412 A1* | 6/2008 | Headrick | 715/712 |
| 2008/0184013 A1* | 7/2008 | Tanimoto | 712/226 |
| 2008/0283599 A1* | 11/2008 | Rasband et al. | 235/439 |
| 2008/0307329 A1 | 12/2008 | Endoh | |
| 2009/0108064 A1* | 4/2009 | Fernandes et al. | 235/380 |
| 2009/0109941 A1* | 4/2009 | Carter | 370/338 |
| 2010/0023856 A1* | 1/2010 | Hoshino et al. | 715/274 |

FOREIGN PATENT DOCUMENTS

| | | |
|---|---|---|
| JP | 2003-150971 | 5/2003 |
| JP | 2005-045370 | 2/2005 |
| JP | 2005-309978 | 11/2005 |
| JP | 2006-203808 | 8/2006 |
| JP | 2006-260085 | 9/2006 |
| JP | 2008-305264 | 12/2008 |

OTHER PUBLICATIONS

Japanese Office Action dated Feb. 21, 2012.

* cited by examiner

FIG.4

| PAGE COMPONENT | FUNCTION | PARAMETER VALUE |
|---|---|---|
| BUTTON A | FUNCTION A | X |
| BUTTON B | FUNCTION A | Y |
| BUTTON C | FUNCTION A | OFF |
| BUTTON D | FUNCTION B | M |
| BUTTON E | FUNCTION B | N |
| ⋮ | ⋮ | ⋮ |

FUNCTION TABLE

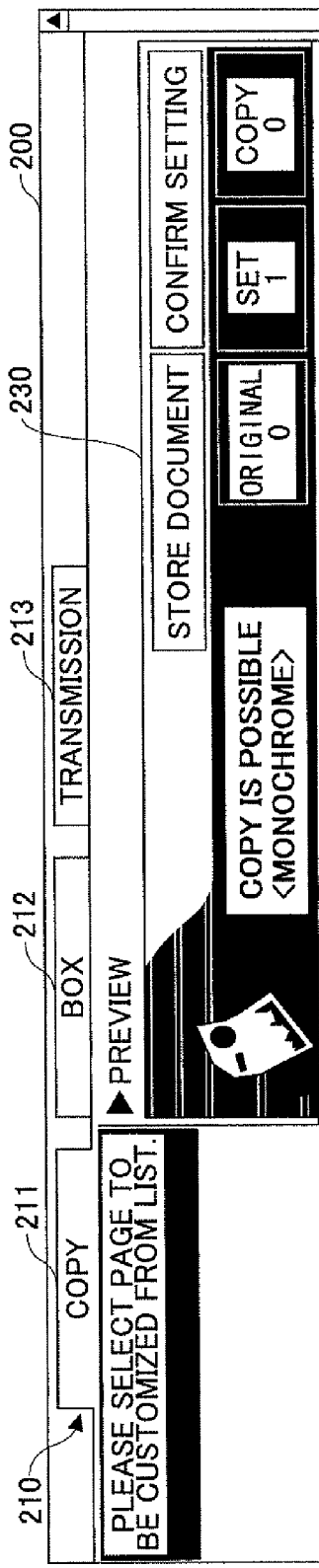

FIG.5B

```
▼ COPY TOP PAGE
▶ COLOR SELECTION:TWO-COLOR PAGE
▶ COLOR SELECTION:SINGLE-COLOR PAGE
▶ ORIGINAL TYPE SELECTION PAGE
▼ SPECIAL ORIGINAL SETTING PAGE
   ▼ ORIGINAL SIZE DESIGNATING PAGE
      ▶ STANDARD SIZE PAGE
      ▶ NONSTANDARD SIZE PAGE
▶ DOCUMENT STORING PAGE
▶ SETTING CONFIRMATION PAGE
▶ FINISH PAGE
▼ FRONT PAGE/INSERTING PAPER PAGE
   ▶ CHAPTER BREAK PAGE
▼ EDIT COLOR PAGE
   ▼ COLOR PAGE
      ▶ COLOR CHANGE PAGE
      ▶ DESIGNATED COLOR DELETION PAGE
      ▶ UNDER COLOR PAGE
      ▼ COLOR ADJUSTMENT PAGE
         ▶ COLOR BALANCE PAGE
         ▶ COLOR ADJUSTMENT PAGE
         ▶ IMAGE QUALITY ADJUSTMENT PAGE
      ▶ COLOR REGISTRATION PAGE
   ▶ BINDING MARGIN PAGE
   ▼ DELETION PAGE
      ▶ CENTER/FRAME DELETION PAGE
   ▼ PRINTING PAGE
      ▶ SECURITY CONTROL NUMBERING PAGE
      ▶ STAMP PRINTING PAGE
      ▶ USER STAMP PRINTING PAGE
      ▶ DATE PRINTING PAGE
      ▶ PAGE PRINTING PAGE
   ▼ IMAGE EDITING PAGE
      ▶ REPEAT PAGE
▼ BOTH SIDE/INTEGRATE/DIVIDE PAGE
   ▶ BOTH SIDE PAGE
   ▶ INTEGRATE PAGE
   ▶ DIVIDE PAGE
   ▶ BINDING PAGE
▼ SIZE CHANGE PAGE
   ▶ TEN-KEY ZOOM PAGE
   ▶ DIMENSION SIZE CHANGE PAGE
   ▶ INDEPENDENT SIZE CHANGE mm PAGE
   ▶ INDEPENDENT SIZE CHANGE % PAGE
```

~220

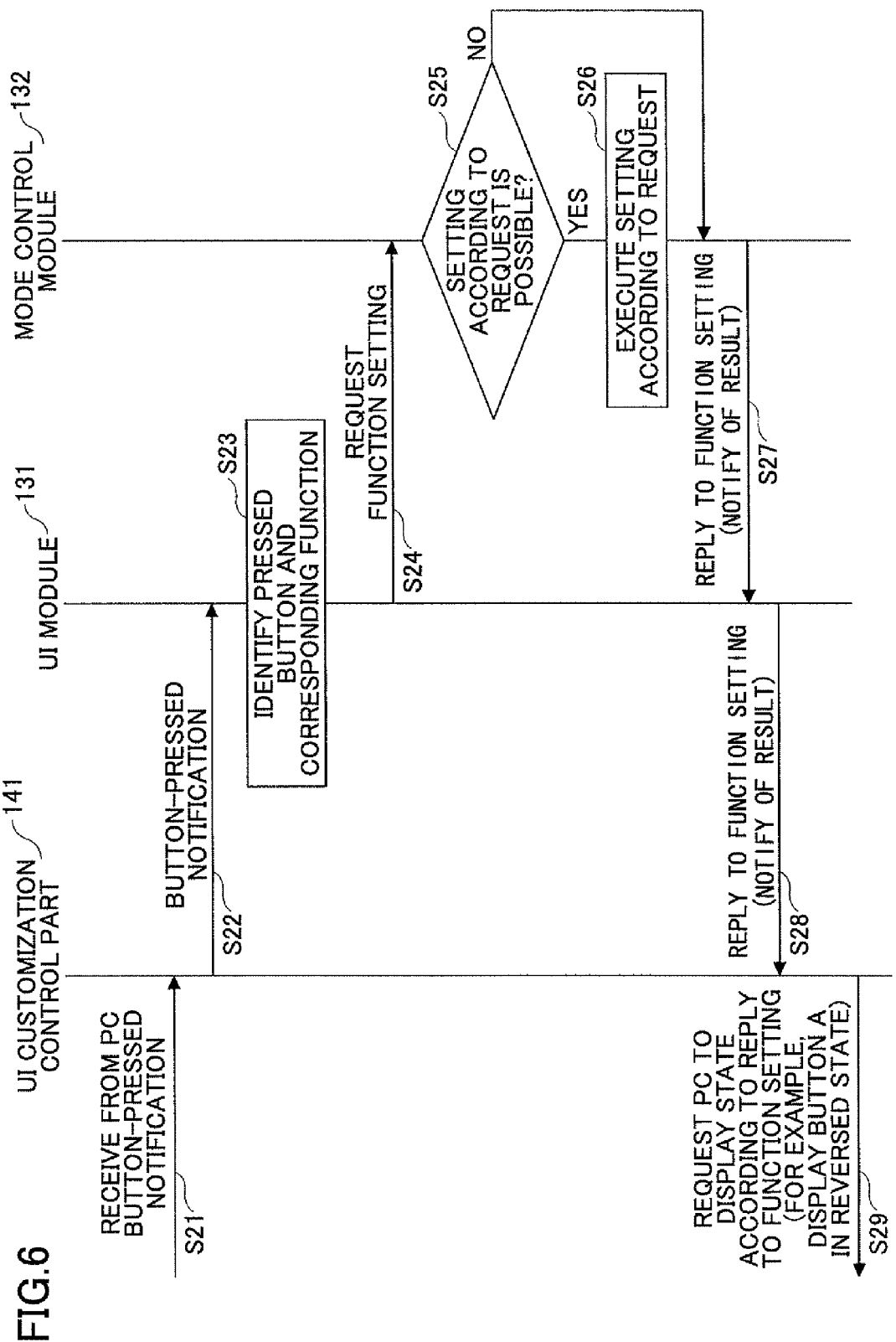

FIG.8

| TYPE ATTRIBUTE | EXAMPLE OF DISPLAY CONTENTS |
|---|---|
| ONE BEING SELECTED TYPE | ONE SIDE ORIGINAL \| BOTH SIDE ORIGINAL<br>OR<br>ONE SIDE ORIGINAL \| BOTH SIDE ORIGINAL |
| SELECTION TYPE | STAPLE 1 \| STAPLE 2<br>OR<br>STAPLE 1 \| STAPLE 2<br>OR<br>STAPLE 1 \| STAPLE 2 |
| TOGGLE TYPE | SORT  OR  SORT |
| FEEDBACK TYPE | MANY PAGE ORIGINAL |
| NON-DISPLAY TYPE |  |

FIG.9

| ORDER | PAGE COMPONENT | SETTING |
|---|---|---|
| 1 | OPTION 1-A | OFF |
| 2 | OPTION 2-B | ON |
| 3 | EMPTY | |
| 4 | EMPTY | |
| ⋮ | ⋮ | ⋮ |

PRIORITY SETTING INFORMATION TABLE

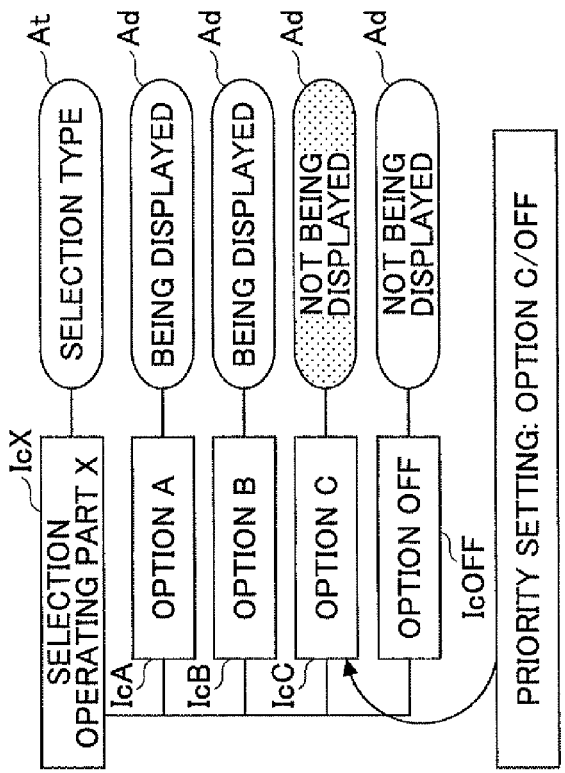
FIG.17B
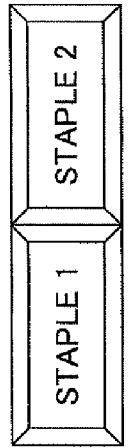
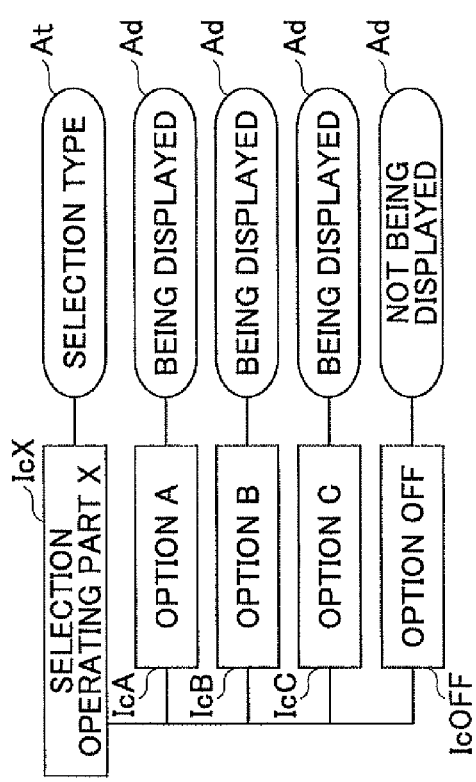
FIG.17A
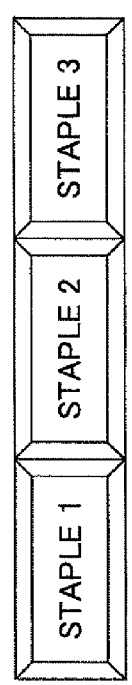

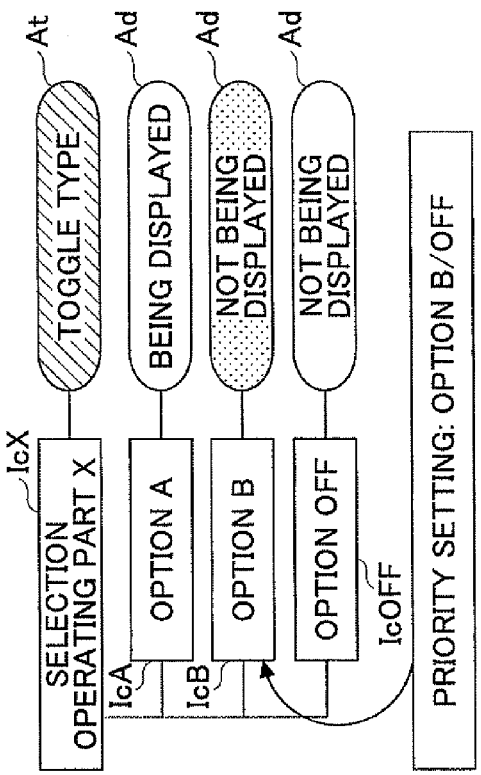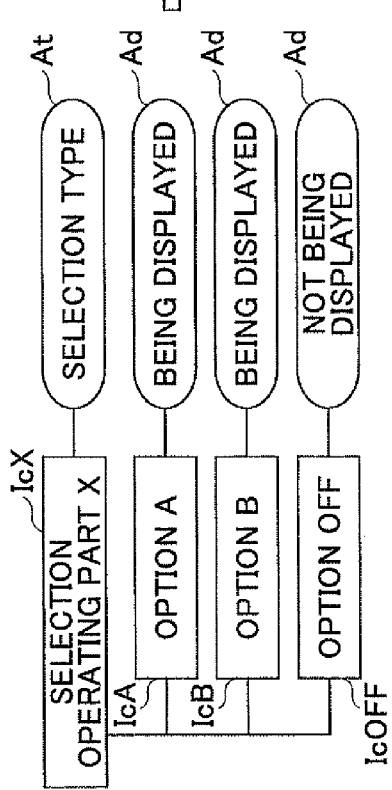
FIG.19A
FIG.19B

FIG.20A
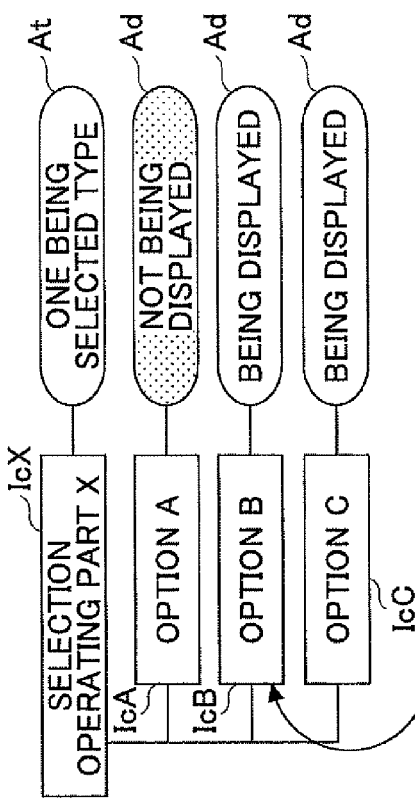
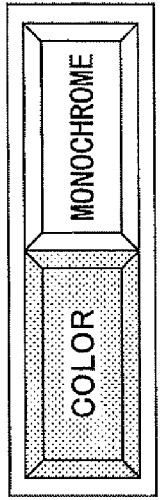
OPTION B IS IN SELECTED STATE
FIG.20B
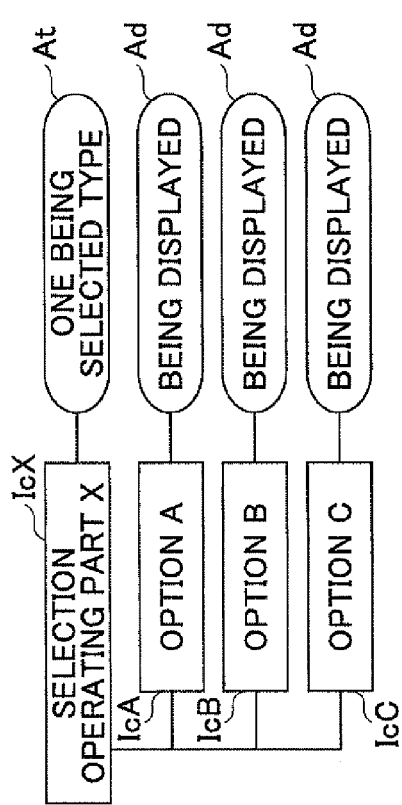
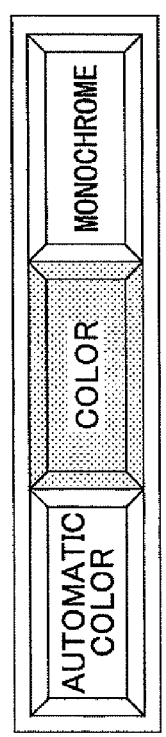
PRIORITY SETTING: OPTION B/ON

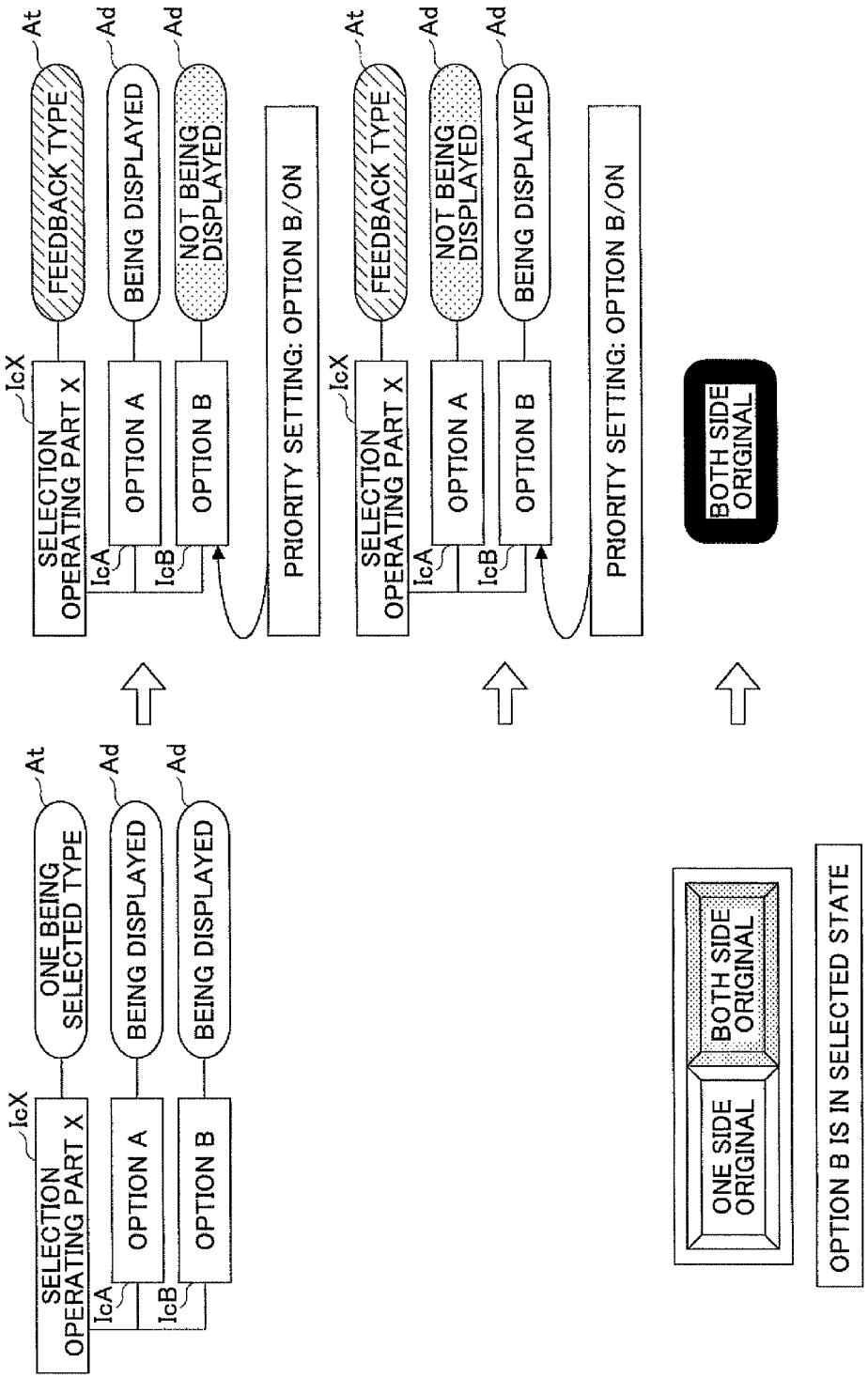

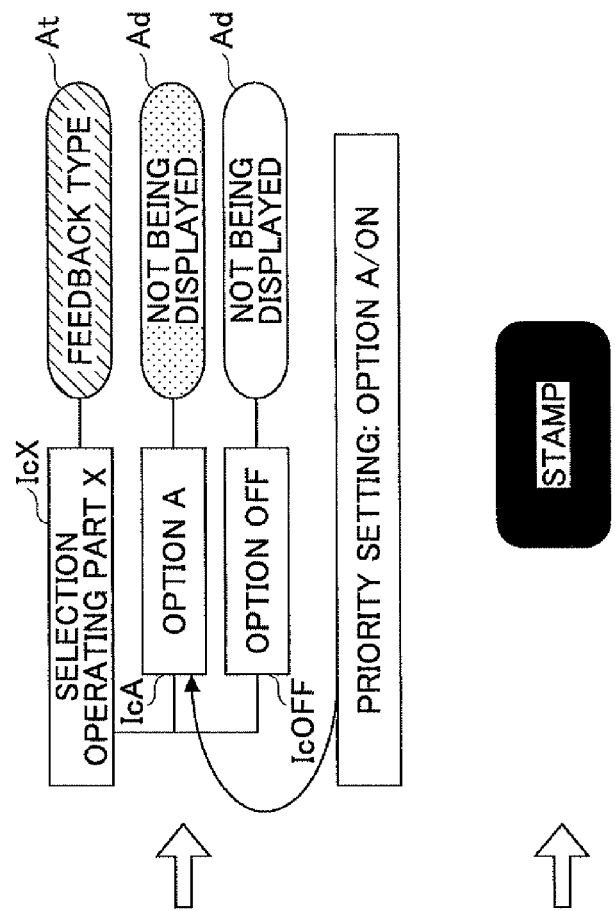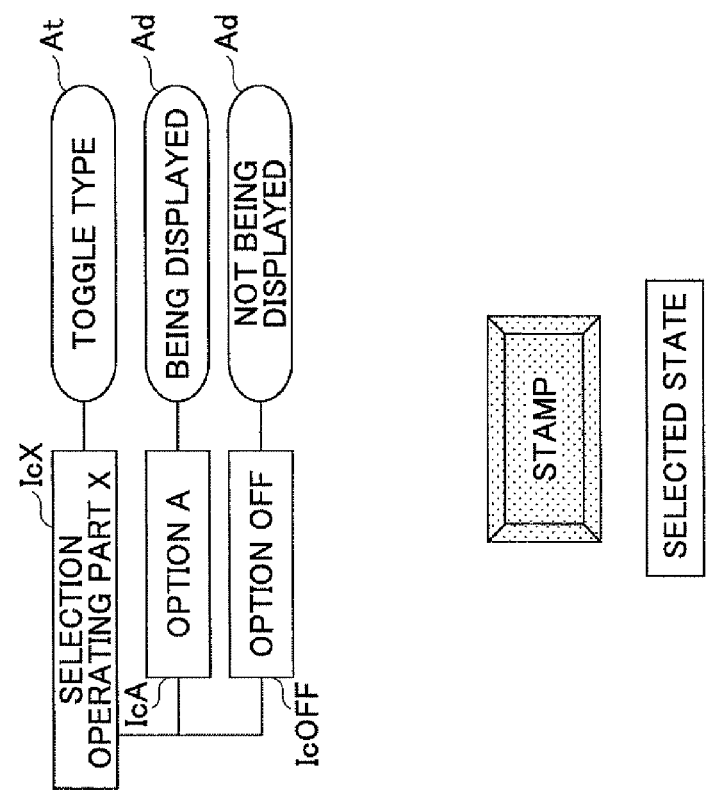

SCREEN EDITING APPARATUS, SCREEN EDITING METHOD AND COMPUTER-READABLE INFORMATION RECORDING MEDIUM

BACKGROUND OF THE INVENTION

1. Field of the Invention

The present invention relates to a screen editing apparatus for editing the contents of an operating page to be displayed on a display device, a screen editing method for editing the contents of an operating page to be displayed on a display device, a screen editing program for causing a computer processor to carry out the screen editing method, an electronic apparatus for displaying the operating page on the display device based on data edited by means of the screen editing apparatus or the screen editing method, and an image forming apparatus which is one of such an electronic apparatus.

2. Description of the Related Art

Such a configuration is known that, a GUI (Graphical User Interface) is displayed on a display device, and, with the use of the GUI, various data is displayed to a user or an operation by a user is received.

Design of such a GUI can be carried out in such a manner that various components, such as a button for receiving the operation by a user, a character displaying frame for displaying set contents and so forth, are disposed on a page. Further, recently, there are many requests for customization of a GUI to meet a user's purpose by editing the contents of a pager in addition to a case where a GUI provided by a manufacturer is used as it is.

The following patent documents 1, 2 and 3, for example, discuss customization of a GUI:

Patent Document 1: Japanese Laid-Open Patent Application No. 2005-45370

Patent Document 2: Japanese Laid-Open Patent Application No. 2003-150971

Patent Document 3: Japanese Laid-Open Patent Application No. 2003-5825

The patent document 1 discusses an image forming apparatus with which it is possible to change a display or non-display state, a position, a size and so forth of each function key on a display page displayed on a liquid crystal display device, by selecting a panel customization mode.

The patent document 2 discusses an art such that an operating page of an electronic apparatus can be edited as a result of a server being accessed from a user terminal. Further, the patent document 2 discusses an example of editing such as increasing/decreasing a size of an operating button, cutting a part, combining parts, changing a position, or killing (or deleting) a function of the operating button, and so forth.

The patent document 3 discusses an industrial machine with which it is possible to customize a GUI by modifying a HTML file setting a page layout.

Further, a patent document 4 (Japanese Laid-open Patent Application No. 2006-260085) discusses access rolls for efficiently controlling a user authentication process, and a proving process for the authenticated user being able to use a function, and controlling, by a manager of a system, available functions according to a user's request.

Recently, in various electronic apparatuses typified by image forming apparatuses, a function of such customization of a GUI is provided as a set function which may be set for the entirety of an apparatus. In such an apparatus, a user can change a display position, a size and so forth of each button, a caption or such, or can select usable or operable functions by changing a display/non-display state of each button on a GUI.

Further, a program function or a macro function is known such that set contents or a series of set operation contents in an apparatus are previously registered, and can be reflected on operation of the apparatus as a result of being called as is necessary.

However, if such a GUI customization function and a program function or a macro function are used simultaneously, an inappropriate setting may be carried out by a user in particular in a case where a plurality of users share data concerning the functions.

For example, a case is assumed where, while a first user uses a first GUI which the first user has customized, and the first user calls a program or a macro, which has been created by a second user as being used with a second GUI different from the first GUI. In this case, in the program or the macro, an instruction may be described such that a function concerning a button, which is not displayed on the first GUI, is to be turned on. When such an instruction is described in the program or the macro and is executed during the first user uses the first GUI, a corresponding function, which is not displayed on the first GUI at all, is turned on, and the turning on of the button may not be known by the first user. It is necessary to solve such a problem in a case where page data created by means of a customization function or a program or macro data created by means of a program or a macro function are shared by a plurality of users.

It is noted that the same problem may occur even in a case of a single user due to an erroneous operation, misunderstanding or such, which may occur upon creation of a program or a macro.

SUMMARY OF THE INVENTION

The present invention has been devised for solving the above-mentioned problem, and an object of the present invention is to prevent a contradiction from occurring between the display contents on a page and the set contents in an apparatus even in a case where a page to be displayed on a display device is edited, and a display or non-display state of an option of a selection operating part displayed on the page can be changed.

In order to achieve the object, according to the present invention, a screen editing apparatus for editing contents of an operating page to be displayed on a display device, includes an attribute storing part configured to store, as data to prescribe a state of a selection operating part having a plurality of options, disposed on the operating page, a type attribute indicating a type of the selection operating part, a display attribute indicating whether to display an operating part corresponding to each option of the selection operating part, and priority setting information indicating contents of modification of a setting for an option of the selection operating part, the modification being carried out while the operating page is displayed on the display device, a selection state switching part configured to switch, in response to a user's operation, between a selected state and a non-selected state of an operating part corresponding to an option of the selection operating part disposed on the operating page, a display attribute changing part configured to change, in response to a user's operation, a value of the display attribute stored by the attribute storing part, and a priority setting information registering part configured to register information corresponding to the type attribute of the selection operating part having an option and a selected or a non-selected state of an operating part corresponding to the option of the selection operating part for which a display attribute has been changed, as the priority setting information in the attribute storing part, when the display attribute is changed for the option of the selection operating part.

According to another aspect of the present invention, a screen editing method for editing contents of an operating page to be displayed on a display device, includes a computer processor storing, as data to prescribe a state of a selection operating part having a plurality of options, disposed on the operating page, a type attribute indicating a type of the selection operating part, a display attribute indicating whether to display an operating part corresponding to each option of the selection operating part, and priority setting information indicating contents of modification of a setting corresponding to an option of the selection operating part, the modification being carried out while the operating page is displayed on the display device, the computer processor switching, in response to a user's operation, between a selected state and a non-selected state of an operating part corresponding to an option of the selection operating part disposed on the operating page, the computer processor changing, in response to a user's operation, a value of the display attribute having been stored by the computer, and the computer processor registering information corresponding to the type attribute for the selection operating part having an option for which the display attribute has been changed and a selected or a non-selected state of the operating part corresponding to the option, as the priority setting information in the attribute storing part, when the display attribute is changed for the option of the selection operating part.

According to further another aspect of the present invention, a computer-readable information recording medium stores a screen editing program which, when executed by a computer processor, performs a screen editing method, and the method includes storing, as data to prescribe a state of a selection operating part having a plurality of options, disposed on an operating page, a type attribute indicating a type of the selection operating part, a display attribute indicating whether to display an operating part corresponding to each option of the selection operating part, and priority setting information indicating contents of modification of a setting corresponding to an option of the selection operating part, the modification being carried out while the operating page is displayed, switching, in response to a user's operation, between a selected state and a non-selected state of an operating part corresponding to an option of the selection operating part disposed on the operating page, changing, in response to a user's operation, a value of the display attribute having been stored, and registering information corresponding to the type attribute for the selection operating part having an option and a selected or a non-selected state of the operating part corresponding to the option, as the priority setting information in the attribute storing part, when the display attribute is changed for the option of the selection operating part.

According to further another aspect of the present invention, an electronic apparatus includes a page data obtaining part configured to obtain page data as data to prescribe a state of a selection operating part having a plurality of options, disposed on an operating page, the page data comprising a type attribute indicating a type of the selection operating part, a display attribute indicating whether to display an operating part corresponding to each option of the selection operating part, and priority setting information indicating contents of modification of a setting corresponding to an option of the selection operating part, the modification being carried out while the operating page is displayed on a display part, a display control part configured to display on the display part the operating page for receiving a user's operation, wherein, on the operating page, based on the page data obtained by the page data obtaining part, images of the selection operating part and the options included in the selection operating part are disposed, a set content storing part configured to store set contents to be reflected on operation of the electronic apparatus, a set content changing part configured to change the set contents stored in the set content storing part according to a set of set contents previously stored in a storing part or a set of commands provided for changing the set contents stored in the set content storing part, after calling the set of set contents or the set of commands, and a set content modifying part configured to modify, when the set content changing part has changed the set contents, the thus-changed set contents according to priority setting information included in the page data of the operating page which is currently displayed on the display part.

According to yet another aspect of the present invention, an image forming apparatus includes the above-mentioned electronic apparatus, and an image forming part configured to form an image on paper according to image data and the set contents stored in the set content storing part.

Other objects, features and advantages of the present invention will become more apparent from the following detailed description when read in conjunction with the accompanying drawings.

BRIEF DESCRIPTION OF THE DRAWINGS

FIG. 4 depicts an example of a function table used in the operation sequence depicted in FIG. 3;

FIGS. 5A, 5B and 5C depict an example of a display of a GUI editing page for the PC acting as the screen editing apparatus to receive an editing operation for a page to be displayed on an operating panel of the image processing apparatus depicted in FIG. 1;

FIG. 6 depicts a sequence diagram of respective parts in a case where the image processing apparatus depicted in FIG. 1 is notified of operation contents on the GUI from the PC;

FIG. 8 depicts settable types of a type attribute of a selection operating part, and examples of display contents in a case where each type is set;

FIG. 9 depicts an example of a priority setting information table prescribing the contents of priority setting information;

FIGS. 17A and 17B depict a specific example of changing a setting in the process depicted in FIG. 14;

FIGS. 19A and 19B depict another specific example of changing a setting in the process depicted in FIG. 14;

FIGS. 20A and 20B depict a specific example of changing a setting in the process depicted in FIG. 15;

FIGS. 21A and 21B depict another specific example of changing a setting in the process depicted in FIG. 15;

FIGS. 23A and 23B depict another specific example of changing a setting in the process depicted in FIG. 16.

DETAILED DESCRIPTION OF THE PREFERRED EMBODIMENTS

Below, embodiments will be described with reference to figures.

A screen editing apparatus in an embodiment is used to edit the contents of an operating page to be displayed on a display device of another apparatus. The screen editing apparatus may be embodied as a result of a corresponding editing function is included in an apparatus which displays the operating page. Alternatively, the screen editing apparatus may be embodied as a result of a corresponding application program executed in a computer such as a PC (Personal Computer) which is capable of communication via a communication network or such with an apparatus which displays the operating page.

Further, a screen editing function may be provided in an apparatus itself which displays the operating page, which apparatus functions as an application server, and the screen editing function may be used via a common client application such as a Web browser from a PC or such. Further, a completely separate screen editing apparatus may edit only data of the operating page, the data may be then stored in a recording medium, and an apparatus which displays the operating page may read the data from the recording medium.

That is, any hardware may be used to embody the screen editing apparatus as long as the hardware has a CPU, a ROM, a RAM and so forth, and has a certain operation capability.

Here, as one example, a PC acts as the screen editing apparatus, and the operating page displayed by an image processing apparatus which is connected with the PC via a communication network is edited. First, a configuration of the image processing apparatus which is an example of an apparatus which displays a page based on page data edited by the screen editing apparatus will be described.

Figure 1:
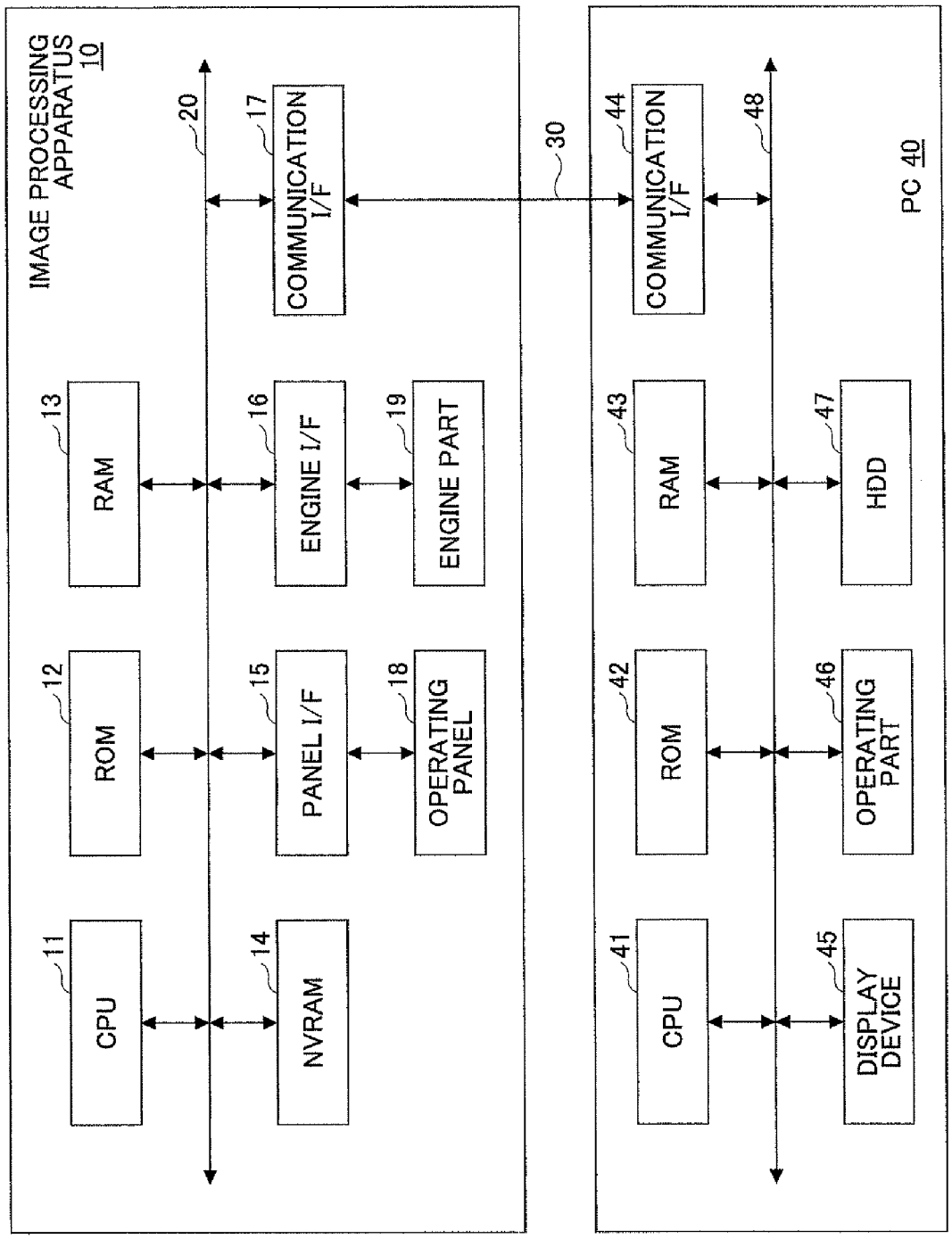
FIG. 1 depicts a block diagram of hardware configurations of a PC (Personal Computer) acting as a screen editing apparatus in an embodiment and an image processing apparatus as one example of an apparatus which displays a page according to page data edited by the screen editing apparatus.
Figure 2:
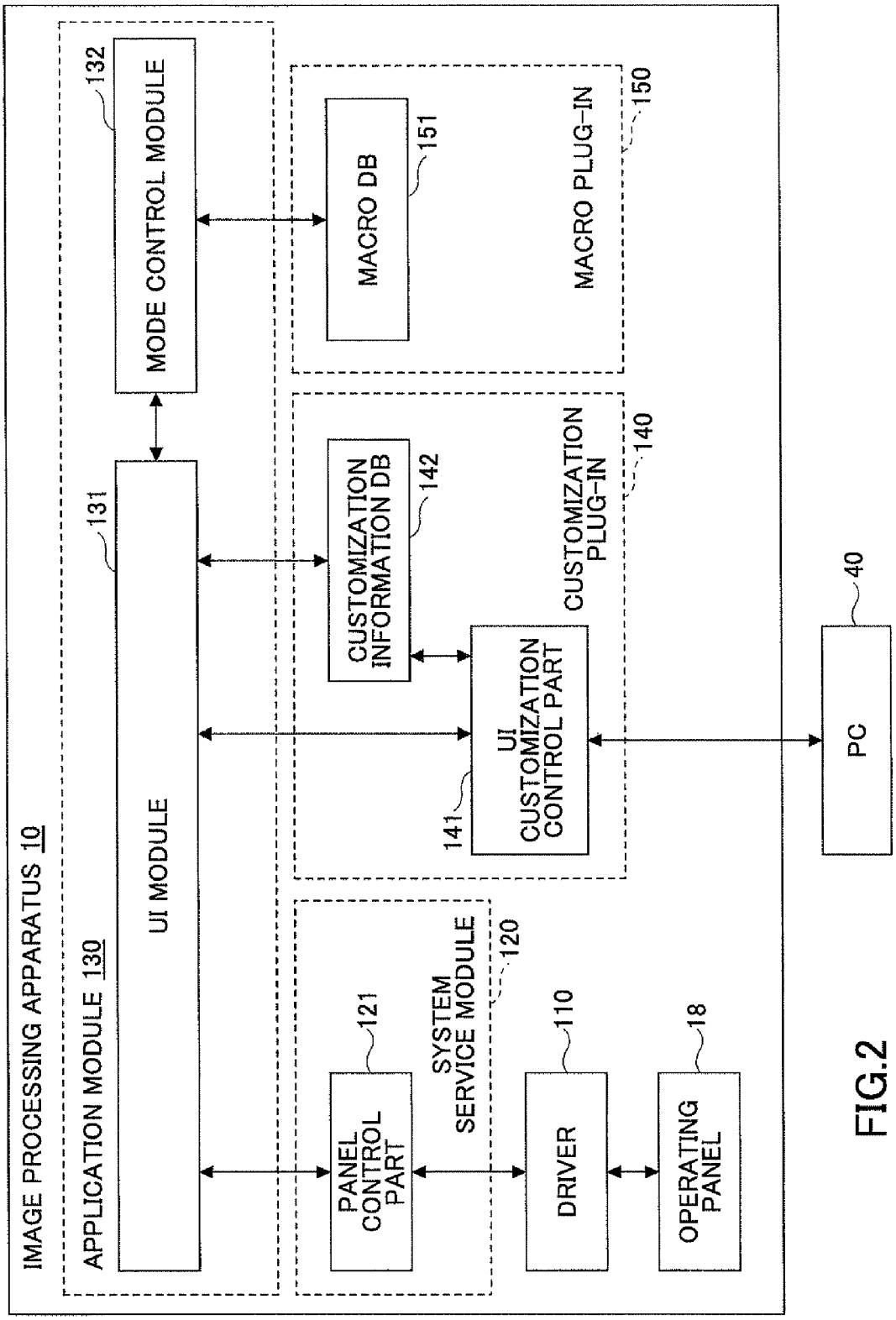
FIG. 2 depicts a function block diagram of functions of the image processing apparatus depicted in FIG. 1, concerning setting a change through operation of a GUI, customization of the GUI, and setting change with the use of a macro.

FIG. 1 depicts a block diagram of hardware configurations of the image processing apparatus and the PC. FIG. 2 depicts a function configuration of the image processing apparatus.

The image processing apparatus 10 acts as an electronic apparatus or acts as an image forming apparatus. As depicted in FIG. 1, the image processing apparatus 10 includes an engine part 19 including a printer engine, a scanner engine and an image storing HDD, and a communication I/F 17. The image processing apparatus 10 further includes a control part which includes a CPU 11, a ROM 12 and a RAM 13. The control part controls the engine part 19 and the communication I/F 17 so that the image processing apparatus 10 performs functions of printing, scanning, copying, a document box and facsimile communication. The image processing apparatus 10 has an operating panel 18 in which a touch panel is laminated to a liquid crystal display device (LCD) which acts as a display device. A GUI is displayed on the operating panel 18. The image processing apparatus 10 receives an operation carried out by a user, such as a setting operation, an operating instruction, and so forth, via the GUI, and carries out the operation according to the received instructions. Further, data of set contents and so forth which are necessary for the image processing apparatus 10 to operate, which data is changeable and should be held even after power supply has been turned off, is stored in a NVRAM (Non-Volatile RAM) 14.

The CPU 11, ROM 12, RAM 13, NVRAM 14 and communication I/F 17 are connected together by a system bus 20. The operating panel 18 and the engine part 19 are connected to the system bus via a panel I/F 15 and an engine I/F 16, respectively.

By means of the communication I/F 17, communication with the PC 40 via the communication network 30 such as a LAN (Local Area Network) is made possible. It is noted that, for the communication, any communication means may be used, including wired or wireless communication.

The PC 40 is one embodiment of the screen editing apparatus. As depicted in FIG. 1, the PC 40 includes a CPU 41, a ROM 42, a RAM 43, a communication interface (I/F) 44, a display device 45, an operating part 46 and a HDD (Hard Disk Drive) 47. These parts/components are connected together via a system bus 48. The display device 45 may include, for example, a liquid crystal display device, and the operating part 46 may include, for example, a mouse, a keyboard and so forth. An external display device or operating part may be used as the display device 45 or operating part 46.

The hardware of each of the above-mentioned parts/components may have a well-known configuration.

As a result of an operating program stored in the ROM 42 or the HDD 17 being executed by the CPU 41, the functions of the screen editing apparatus described later are performed.

FIG. 2 depicts functions of the image processing apparatus 10 concerning a change of a setting carried out as a result of the GUI being operated, customization of the GUI, and a change of a setting carried out with the use of a macro.

The image processing apparatus 10 has a system service module 120 and an application module 130 each of which is a basic module embodied by software. Further, the image processing apparatus 10 has a customization plug-in 140 and a macro plug-in 150 each of which is a plug-in module which is embodied by software and may be added freely.

The system service module 120 is inserted between a hardware resource such as the operating panel 18 and the application module 130, receives an operation request for the hardware resource from the application module 130, and carries out arbitration of the operation requests, and execution control of an operation based on the operation requests. It is noted that the hardware resource is driven by a corresponding driver 110, and the system service module 120 sends or receives an operation request to or from the driver 110.

A panel control part 121 of the system service module 120 has a function of displaying a page and detecting an operation carried out by a user on the operating panel 18.

The application module 130 provides a function of carrying out an operation according to a direction given by a user or a command given by an external apparatus, by controlling hardware typified by the operating panel 18 via the system service module 120 and the driver 110. FIG. 2 depicts merely the single application module 130. However, a plurality of application modules 130 may be provided. For example, application modules 130 may be provided for respective functions such as copying, facsimile communication, scanning, printing and a document box.

A specific configuration of the application module 130 differs for a function to perform. FIG. 2 depicts a configuration which may be provided generally in any specific configuration of the application module 130. A UI (User Interface) module 131 of the application module 130 depicted in FIG. 2 has a function of displaying or erasing a GUI page, and monitoring an operation carried out on the GUI. When detecting a user's operation on the GUI, the UI module 131 notifies a mode control module 132.

The mode control module 132 has a function of setting an operation mode of the image processing apparatus 10 according to an operation carried out by a user on the GUI. The mode control module 132 carries out not only reflecting the contents of a given operation on the operation mode but also carries out control of "first priority" in which, in a case where a first setting exists, a second setting is inhibited, and "last priority" in which in a case where a first setting is carried out, a second setting is cancelled. The set contents prescribing the contents of the operation mode may be stored in the RAM 13 or the NVRAM 14.

The customization plug-in 140 has a UI customization control part 141 and a customization information Ds (DataBase) 142, and provides a function concerning customization of a GUI.

The UI customization control part 141 has a function of responding to a request from the external screen editing apparatus such as the PC 40, and providing page data used by the image processing apparatus 10 for displaying a GUI for being edited, and setting page data after being edited to be used for display.

The customization information DB 142 acts as a storing part for storing the page data, provides the page data for being edited in response to a request from the UI customization control part 141, or provides the page data for display in response to a request from the UI module 131. The customization information DB 142 also stores page flow information indicating the contents of a change of a page carried out according to an operation given by a user on a GUI.

The macro plug-in 150 provides a function concerning "lump sum changing" of settings or "automatic changing" of setting in the image processing apparatus 10. The macro plug-in 150 has a macro DB 151, and the macro DB 151 stores a set of the set contents or a macro which includes a set of commands for changing the set contents, in the image processing apparatus 10.

As the above-mentioned set of the set contents, all or a part of the set contents, which are reflected upon operation of the image processing apparatus 10 at a certain time, are stored in the macro DB 151 by the mode control module 132 according to an operation given by a user. Then, according to an actual operation of a user or such, the set contents thus stored in the macro DB 151 is read out at a desired time by the mode control module 132, and the set contents to be reflected on operation of the image processing apparatus 10 can be replaced by the thus-read set contents.

As the above-mentioned macro, a plurality of commands indicating operations of buttons in a predetermined order or changes of the set contents according to a predetermined rule are stored in the macro DB 151 by the mode control module 132 or another module not depicted in FIG. 2. Then, according to an operation of a user or such, a set of commands stored in the macro DB 151 are read out at a desired time by the mode control module 132, which then executes the thus-read commands in sequence, whereby the set contents to be reflected upon operation of the image processing apparatus 10 are changed. It is noted that an operation carried out as a result of a command being executed is an operation of generating a button operation detecting event (in this case, also an operation triggered by the generated event being carried out), an operation of changing the set contents according to a predetermined rule, or such.

Next, a process of the image processing apparatus 10 changing the set contents of the image processing apparatus 10 according to an operation carried out by a user on the operating panel 18 will be described.

In a case where a GUI is to be displayed on the operating panel 18 of the image processing apparatus 10, the UI module 131 obtains page data of the GUI from the customization DB 142 (or a predetermined DB in a case where the page data not customized is used), transfers the obtained page data to the panel control part 121, and requests the panel control part 121 to display a page of the GUI according to the page data on the operating panel 18.

Then, the panel control part 121 directs the driver 110 to display buttons or texts of sizes, shapes and the contents prescribed by the received page data at positions prescribed by the page data. The driver 110 drives the operating panel 18 according to the direction, and thus, the GUI according to the contents of the page data is displayed on the operating panel 18.

Further, when an operation is carried out by a user on the GUI displayed on the operating panel 18, the driver 110 detects a position on the GUI at which the operation has been carried out and the contents of the operation, and transfers the position and the contents to the panel control part 121. Then, the panel control part 121 determines, based on the page data of the GUI which is currently displayed, at which button (or another operating part) the operation has been carried out. Then, when determining that the operation has been carried out to a certain operating part, the panel control part 121 notifies the UI module 131 of the corresponding operating part and a corresponding event indicating the operation contents. For example, a button-pressed notification indicating that a button has been pressed is provided.

Figure 3:
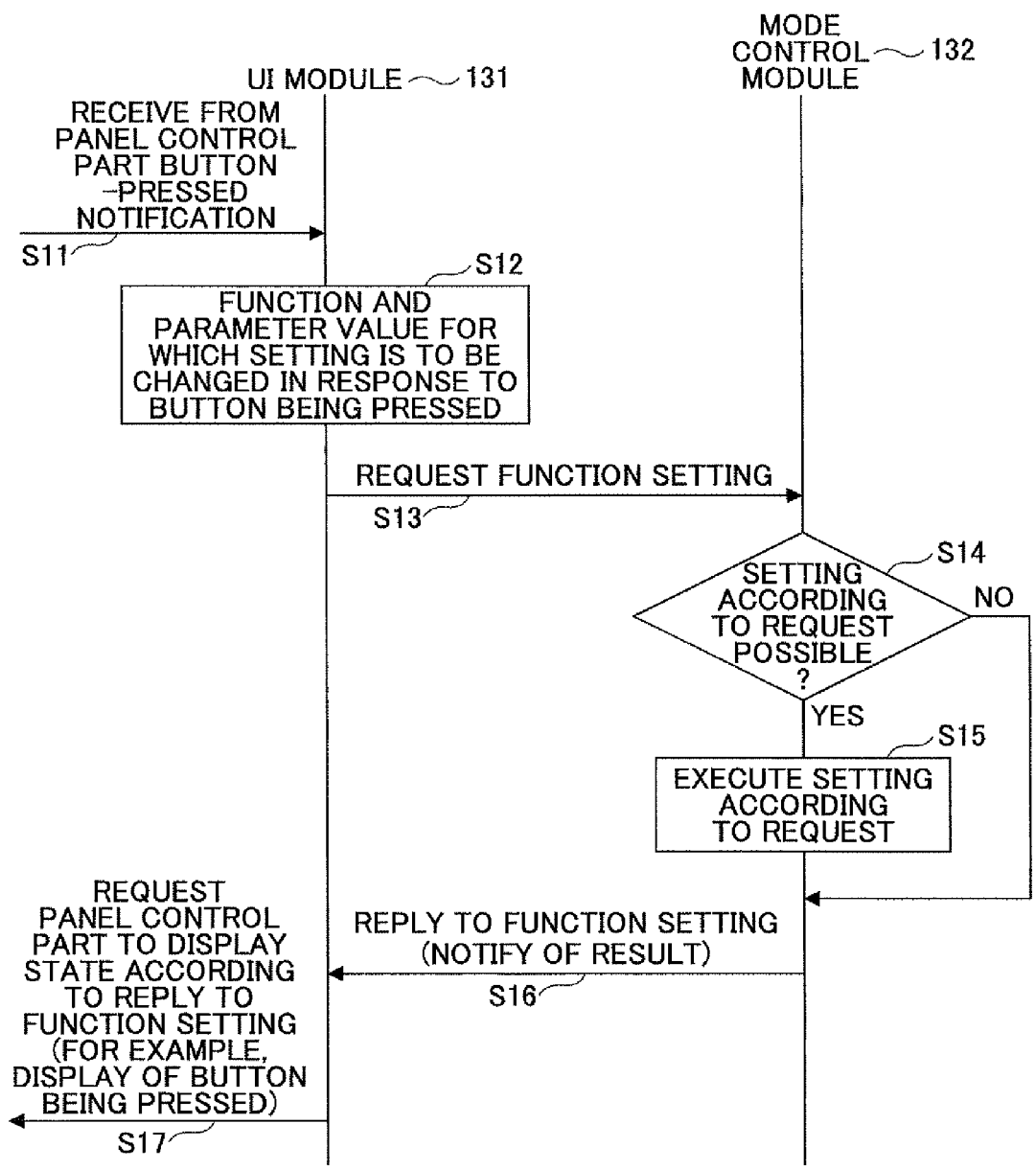
FIG. 3 depicts an operation sequence of a UI module and a mode control module in a case where a button-pressed notification is carried out for the UI module in the image processing apparatus depicted in FIG. 1.

FIG. 3 depicts an operation sequence of the UI module 131 and the mode control module 132 in a case where the button-pressed notification is provided. Further, FIG. 4 depicts an example of a function table used in the operation sequence.

As depicted in FIG. 3, when receiving the button-pressed notification from the panel control part 121 (step S11), the UI module 131 identifies a function and a parameter value to be changed according to the operation of the button being pressed (step S12).

The above-mentioned function corresponds to setting item of the parameter value, and the parameter value indicates a specific set value corresponding to each option selectable for the setting item. For example, the function may be "both side function", and parameter values therefor may be "one side" and "both sides". As another example, for a function of "color setting", three parameter values such as "automatic color", "color" and "monochrome" may be provided as options.

In the image processing apparatus 10, correspondence relationship between page components such as buttons to be disposed on a GUI, functions set by the page components and corresponding parameter values, is stored as the function table depicted in FIG. 4 at a position from which the UI module 131 can read.

Then, by reading the function table depicted in FIG. 4, the UI module 131 recognizes, when a button "A" is turned on, for example, that "X" should be set as a parameter value for a function "A". However, actually, depending on a specific type of a selection operating part, various ways of setting a parameter value may be applied. For example, in one case, a turning on or off of a function may be switched in a toggle manner. In another case, any operation may not be accepted, and a current parameter value may be fixed. How to actually carry out setting is determined as a result of page data of a page which is currently displayed being read.

After that, the UI module 131 transmits to the mode control module 132 a function setting request to request the mode control module 132 to set a parameter value determined in step S12 for a function determined in step S12 (step S13).

The mode control module 132 having received the function setting request determines whether a setting according to the request is allowed (step S14), and carries out the setting when the setting is allowed (step S15). When the setting is not allowed, the mode control module 132 does not carry out the setting. In any case, as a reply to the function setting request, the mode control module 132 replies a result of carrying out or not carrying out the setting, to the UI module 131 (step S16). A case where the setting is not allowed may be a case where the setting causes a contradiction to another setting, a case where relation between the setting and another setting corresponds to an inhibited combination, or such.

When receiving the above-mentioned reply of step S16 (referred to as a function setting reply), the UI module 131 requests the panel control part 121 to display a state of the setting having been carried out, according to the function setting reply (step S17). For example, in a case where, in response to a button being pressed, a parameter value corresponding to the button is set, and a display of the button should be changed to a state of having been pressed (i.e., a selected state), for example, to indicate that the corresponding setting has been actually carried out. Further, a case where one option is selected from among a plurality of options corresponding to respective buttons is assumed. In the case for which, in response to a certain parameter value being set, a state of a button having been pressed may be canceled, the button corresponding to another parameter value having been set until then.

Furthers although not depicted, the panel control part 121 causes the driver 110 to change a display state of a button or such on the operating panel 18 according to the request of step S17.

Through the above-mentioned process of FIG. 3, the image processing apparatus 10 changes a setting of an operation mode according to an operation carried out by a user on the GUI displayed on the operating panel 18.

Next, a function of editing a GUI will be described in more detail.

Any user who has a predetermined authority can freely edit a page to be displayed on the operating panel 18 of the image processing apparatus 10. An operation of editing is carried out in the embodiment in such a manner that, from the PC 40, with the use of a special client application, the image processing apparatus 10 is accessed. The UI customization control part 141 of the image processing apparatus 10 depicted in FIG. 2 receives the access from the client application, and provides data necessary to edit the page.

Figure 5C:
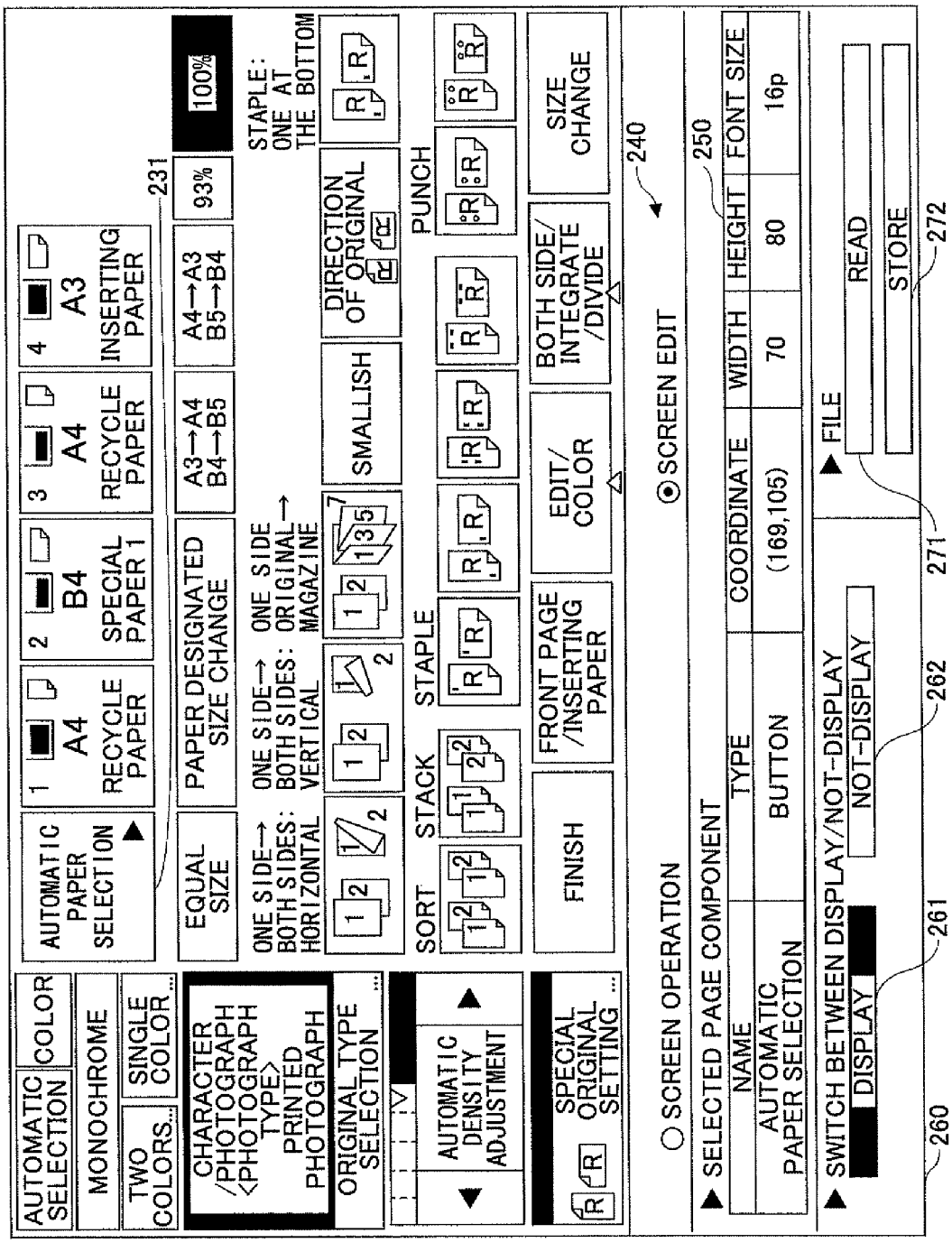

FIGS. 5A, 5B and 5C depict an example of a display of a GUI editing page for receiving an operation to edit a page to be displayed on the operating panel 18. It is noted that, for the sake of convenience, in the GUI editing page of FIG. 5A, the contents of "FIG. 5B" are actually depicted in FIG. 5B, and the contents of "FIG. 5C" are actually depicted in FIG. 5C.

The GUI editing page 200 depicted in FIGS. 5A, 5B and 5C is displayed on a display device of the PC 40 by means of a function of the client application started up in the PC 40.

In the GUI editing page 200 depicted in FIGS. 5A, 5B and 5C, with the use of tabs 210, it is possible to select one of application modules (simply referred to as applications, hereinafter) included in the image processing apparatus 10, and a GUI used by the thus-selected application module is edited. In the example depicted in FIGS. 5A, 5B and 5C, three applications, i.e., a copy application, a document box application and an image transmission application, are installed in the image processing apparatus 10. On the GUI editing page 200, the corresponding three tabs, i.e., a copy tab 211, a box tab 212 and a transmission tab 213, are displayed. In FIGS. 5A, 5B and 5C, the GUT editing page 200 is in such a state for example that the copy tab 211 is selected, and a GUT used by the copy application is edited.

A page list display part 220 displays a list of GUI pages in a tree form used by an application selected by a corresponding one of the tabs 210. A user selects a GUI page to edit from the list. The contents of the GUI page thus selected are then displayed in a preview display part 230. In FIGS. 5A, 5B and 5C, the GUI editing page 200 is in such a state for example that a copy top page which is included in the list at the top is selected and is displayed.

A preview of a GUI page to be displayed on the operating panel 18, on which a user's editing result is reflected, is displayed in the preview display part 230.

As an operation mode of the preview display part 230, a "screen operation" mode or a "screen edit" mode may be selected with the use of a corresponding radio button of a mode switching part 240.

In the "screen operation" mode, it is possible to operate a page displayed in the preview display part 230 through mouse clicking or such, the same as a case where the corresponding GUI page is displayed on the operating panel 18. At this time, the PC 40 notifies the image processing apparatus 10 of an operated button and the contents of the operation, and the image processing apparatus 10 responds to the notification to change the corresponding set contents according to the operation thus carried out on the page displayed on the preview display part 230 as if the corresponding GUI page displayed on the operating panel 18 were operated.

FIG. 6 depicts an operation sequence of the respective parts in a case where the image processing apparatus 10 is notified of the operated contents of a GUI page by the PC 40.

When determining that any operating part on a GUI page displayed on the preview display part 230 has been operated, the PC 40 notifies the image processing apparatus 10 of the operated operating part and a corresponding event indicating the operation contents. The event may have a form the same as that in which the panel control part 121 notifies the UI module 131 in step S11 of FIG. 3. However, it is not necessary to limit the event to this form. Here, as one example, a button-pressed notification the same as that of step S11 of FIG. 3 is used.

Then, as depicted in FIG. 6, the UI customization control part 141 of the image processing part 10 receives the button-pressed notification from the PC 40 (step S21). After that, the UI customization control part 141 transfers the button-pressed notification to the UI module 131 (step S22).

The UI module 131 and the mode control module 132 carry out setting of a parameter value according to the notified operation contents the same as in the case of steps S12 through S16 of FIG. 3 (steps S23 through S27). At this time, the UI module 131 stores a fact that a transmission source of the notification in step S22 is the UI customization control part 141. Then, in step S27, in this case, the UI module 131 does not request the panel control part 121 to display even after receiving a function setting reply in step S27, and instead, transfers the function setting reply to the customization control part 141 (step S28).

Then, the UI customization control part 141 responds to the function setting reply, requests the PC 40 to display a state obtained after the setting according to the contents of the function setting reply which is the same as in the case of step S17 of FIG. 3 (step S29).

Although not depicted in FIG. 6, the PC 40 receives the request, and updates a display of the GUI page in the preview display part 230 according to the request.

It is noted that, a turned on or turned off state of each button (i.e., a selected or non-selected state of a option corresponding to the button) in the GUT page in the preview display part 230 after the updating of the display is stored in page data of the GUI page. Then, when a page is displayed on the operating panel 18 in the image processing apparatus 10 according to the page data, an initial value of a turned on or turned off state of each button is according to the thus-stored value, and also, the set contents in the image processing apparatus 10 is changed to those corresponding to the turned on or turned off state.

Returning to FIG. 5C, in the "screen edit" mode which is the other selectable mode of the mode switching part 240, a user can select an operating part such as a button for which the display contents are to be edited in a page displayed in the preview display part 230, through a clicking operation or such.

Then, information indicating a current state of the operating part to be edited which has been thus selected from the preview display part 230, is displayed in a display-or-not-display display part 260.

In FIG. 5C, a state is depicted in which an automatic paper selection button 231 is selected as an editing target. In a property display part 250, as current information of this button, information, i.e., a name, a type, a coordinate (of a position), a width, a height (which are a size), a font size (of a caption), is displayed. In the displayed information, the coordinate can be edited with the use of an editing operating part such as a cursor button, not depicted, which will be displayed when the GUI editing page 200 is scrolled. An editing result is then immediately reflected on the display in the preview display part 230.

In the display-or-not-display display part 260, a "display" button 261 and a "not-display" button 262 are displayed for setting the button to be edited as "being displayed" or "not being displayed". A button of the buttons 261 and 262 corresponding to the currently set contents is displayed in a reversed fashion. Displaying a button in a reversed fashion means displaying the button in such a manner that colors of the button are reversed from those of an ordinary state. In FIG. 5C, since the automatic paper selection button 231 is in a state of "being displayed", the corresponding "display" button 261 is displayed in a reversed fashion. Then, by pressing the "not-display" button 262, it is possible to set the automatic paper selection button 231 in a state of "not being displayed". This change of the setting of "being displayed" or "not being displayed", as having been actually carried out, is then immediately reflected on the display of the preview display part 230.

Further, in a case where "being displayed" or "not being displayed" of a button corresponding to one option of a selection operating part having a plurality of options is changed, a type of the entirety of the selection operating part may be changed accordingly. This point will be described later in detail, and such a change of a type of the entirety of a selection operating part according to a change of "being displayed" or "not being displayed" of a button, as having been actually carried out, is then immediately reflected on the display of the preview display part 230.

It is noted that, when a certain button is set as "not being displayed", the button is deleted from the preview display part 230 accordingly, and after that, it is therefore not possible to click the button on the page. Therefore, although not depicted in FIGS. 5A, 5B and 5C, a button is provided in the GUI editing page 200 for displaying a list of operating parts included in the page data selected from the page list display part 220, whether the operating parts are "being displayed" or "not being displayed". Therefore, it is possible to select an editing target from this list when it is necessary to edit an operating part of "not being displayed".

Further, the contents of the page thus edited from the GUI editing page 200 can be stored in the customization information DB 142 as a result of a "store" button 272 being pressed. A configuration may be provided such that, by the pressing, the contents are reflected directly on a display in the image processing apparatus 10.

Further, by pressing a "read" button 271, it is possible to read from the customization information DB 142 the contents which have been edited in the past, for editing them again. A configuration may be provided such that, by the pressing, information of page data currently used for display in the image processing apparatus 10 is read out.

Figure 7:
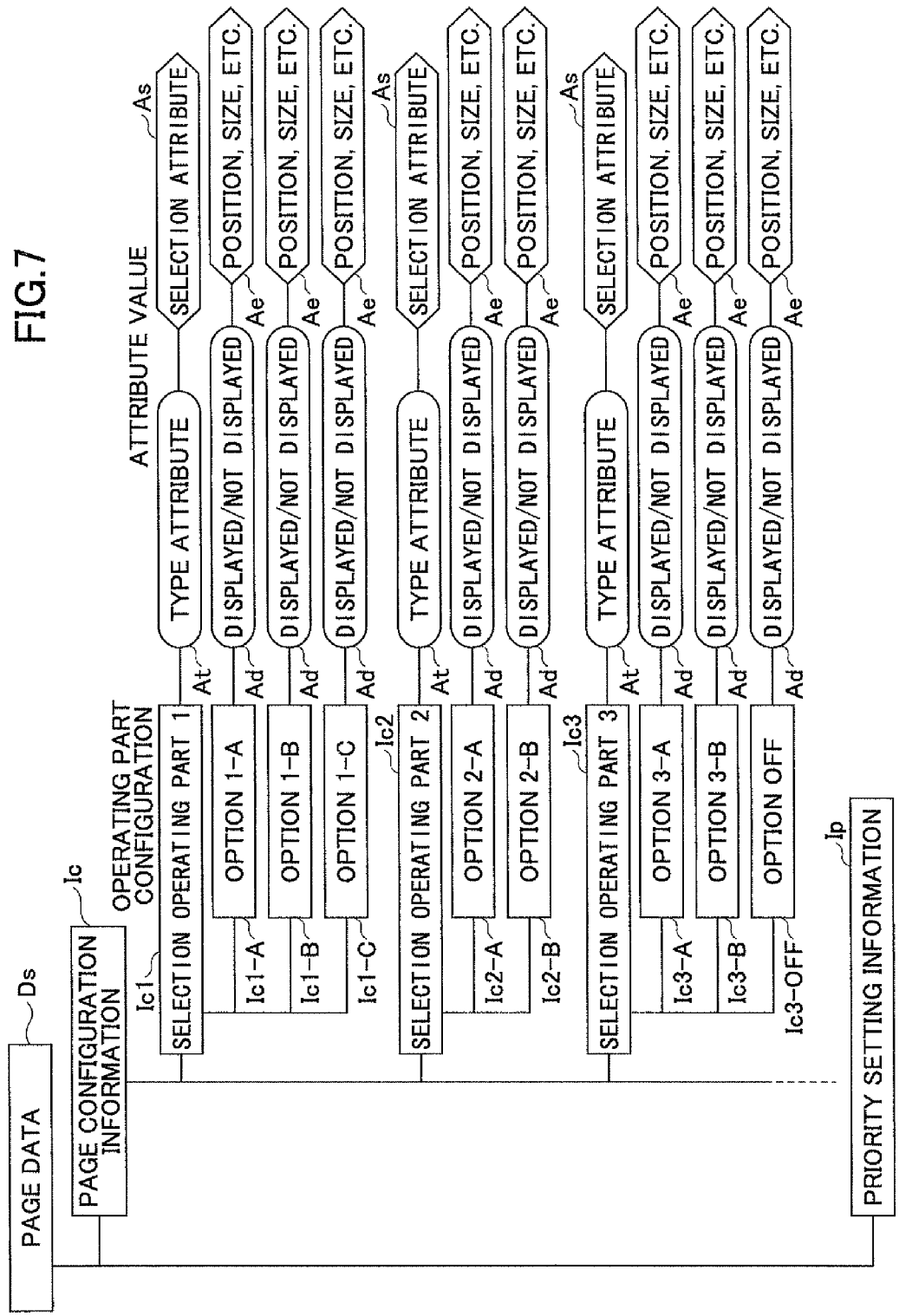
FIG. 7 depicts an example of page data for one page having a configuration for editing carried out by the PC depicted in FIG. 1.

Next, FIG. 7 depicts an example of page data for one page indicating a configuration of a page to be edited by the PC 40.

Page data Ds depicted in FIG. 7 prescribes the contents of a GUI page to be displayed on the operating panel 18 of the image processing apparatus 10, and editing the GUI page is carried out as a result of the page data being appropriately changed. The page data Ds includes page configuration information Ic and priority setting information Ip.

The page configuration information Ic is edited with the use of the GUI editing page 200 of the PC 40 and indicates the contents of the GUI page to be displayed in the image processing apparatus 10. Data concerning states of respective buttons to be operated by a user, which data is included in the page configuration information, is managed as data of selection operating parts Ic1, Ic2, Ic3, . . . as depicted in FIG. 7.

The page configuration information Ic may include, as data indicating the contents of the GUI page, other than the data of the selection operating parts, data of messages and/or images to be constantly displayed, data indicating display frames for displaying set parameter values, or such. However, for the purpose of simplification of description, a configuration of the page configuration information particularly concerning the selection operating parts Ic1, Ic2, Ic3, . . . will be mainly described.

The selection operating parts Ic1, Ic2, Ic3, . . . are provided for respective functions of the image processing apparatus 10, and are information units for managing states of buttons for carrying out settings concerning the corresponding functions. However, in a GUI page actually displayed, it may not be explicitly indicated what range of buttons correspond to a single selection operating part.

As data concerning each selection operating part, options Ic1-A, Ic1-B, Ic1-C, Ic2-A, Ic2-B, Ic3-A, Ic3-B, IcOFF, ... indicating settable set contents for a corresponding function and a type attribute At which is an attribute value indicating a display type for displaying the selection operating part on a GUI page may be designated. Further, as data concerning each selection operating part, a selection attribute As indicating an option which is in a selected state in the selection indicating part is provided. A value of the selection attribute As is automatically set according to an operation carried out by a user in the "screen operation" mode of the GUI editing page 200.

Further, for each option which the selection operating part has, a display attribute Ad indicating "being displayed" or "not being displayed" (corresponding to "displayed/not-displayed" in FIG. 7) of a corresponding button, and other attributes Ae prescribing a position, a size and so forth of the corresponding button, may be designated.

From the data concerning each selection operating part, the display attribute Ad is set according to a user's operation of the display-or-not-display display part 260 of the GUI editing page 200. The other attributes Ae prescribing a position, a size and so forth of the corresponding button are displayed in the property display part 250, and may include attributes which are not actually displayed in the property display part 250.

Further, a type attribute At of a selection operating part is automatically set by the client application of the PC 40 providing a GUI editing function, according to the contents and the number of options, and the contents of the display attribute. However, it is also possible to temporarily turn off the automatic setting or make it possible for a user to manually set the type attribute At, separately from the automatic setting.

It is noted that the number of options prepared for each selection operating part may be freely determined. As specific examples of options, options prescribing specific set contents such as "left", "top" and so forth of a position of a hole to be formed in a case of a punching function, may be provided, and, other than these, an option for turning off a function which is used to set the contents of "not using the function" may be provided. An "option OFF" IcOFF of a selection operating part 3 Ic3 depicted in FIG. 7 corresponds to this sort of option.

FIG. 8 depicts specific examples of settable values of the above-mentioned type attribute At of a selection operating part, and a specific example of the display contents in a case where each type of the type attribute is set.

As a type attribute At of a selection operating part, as depicted in FIG. 8, any one of five types, i.e., a "one being selected type", a "selection type", a "toggle type", a "feedback type" and a "non-display type" may be set.

Among the five types, the one being the selected type is such that, on a page, buttons corresponding to respective options each having a display attribute of "being displayed" are displayed as operating parts. Then, such a selection is allowed that only one of the respective options is selected at any time. That is, such a state is not allowed that none of the respective options is selected. However, an option of the above-mentioned "turning off a function" may be selected.

In FIG. 8, for the one being selected type, two buttons corresponding to two options, i.e., "one side original" (or "single-sided original") and "both side original" (or "double-sided original") are displayed as operating parts. The operating parts have such a state that either one of the two buttons is selected. In FIG. 8, a selected button is indicated as filled with halftone dots. Then, when the selected button is operated by a user, no change occurs. However, when a button which is in a non-selected state is operated by a user, a selection of the selected button is cancelled and a state occurs such that the operated button or a corresponding option is newly selected.

In the embodiment, a type attribute At of a selection operating part is set in the one being selected type in a case where the selection operating part has two or more options each having a display attribute of "being displayed", and also, no option of "turning off a function" having a display attribute of "not being displayed" exists.

Next, the above-mentioned "selection type" is such that, each option having a display attribute of "being displayed" is displayed on a page as an operating part, and such a selection is allowed that one at the maximum is selected from the thus-displayed options. That is, in comparison to the above-mentioned "one being selected type", such a state is allowed that no option is selected. Then, in the embodiment, when such a state occurs that no option is selected, it is regarded that such a setting of "turning off a function" is carried out for the function corresponding to the selection operating part.

In FIG. 8 for the selection type, such an example is depicted that two buttons corresponding to two options, i.e., "staple 1" and "staple 2", are displayed as operating parts. The operating parts may have such a state that either one option is selected and also may have such a state that no option is selected, as depicted in FIG. 8. Then, when a button in a non-selected state is operated by a user, a selection of another button, if any, having been selected until then, is cancelled, and such a state occurs that the thus-operated button or a corresponding option is newly selected. Further, when a selected button is operated by a user, a selection of the button is cancelled.

In the embodiment, a type attribute of a selection operating part is set as the selection type in a case where the selection operating part has two options each having a display attribute of "being displayed", and also, has an option of "turning off a function" having a display attribute of "not being displayed".

It is noted that, in each of the one being selected type and the selection type, basically, a plurality of buttons are displayed for a single selection operating part. Such a plurality buttons displayed for a single selection operating part should not be disposed horizontally as depicted in FIG. 8. A positional relationship between the buttons may be freely determined, and also, a position of each button may be set for each button. Therefore, there may be a case where buttons belonging to a single selection part are displayed at mutually distant positions.

The "toggle type" is such that, a single button is displayed as an operating part, and, with the use of the button, a selection by a user is received in a toggle manner. Specific examples of the toggle type may include an example in which "a selection of a single option" and "turning off a function" may be switched therebetween, another example in which a plurality of options may be switched therebetween in sequence for being selected, or such.

In FIG. 8, as one example of an operating part, a button corresponding to an option of "sort" is displayed. This operating part may enter such a state that "sort" is selected, and such a state that nothing is selected. Each time the button is operated by a user, these states may be switched therebetween in a toggle manner. In the embodiment, a type attribute of a selection operating part is set as the toggle type in a case where the selection operating part has only one option having a display attribute of "being displayed", and also, an option of "turning off a function" having a display attribute of "not being displayed" exists.

The "feedback type" is such that, on a page, the set contents of setting item corresponding to a selection operating part, i.e., the set contents which are currently set for the setting item which is to be set with the use of the selection operating part, are displayed. The set contents ordinarily correspond to any one of the options belonging to the selection operating part. Which one of the options is to be set is determined automatically by means of the CPU 11 of the image processing apparatus 10.

In a case of the feedback type, the selection operating part does not accept an operation carried out by a user, and the set contents cannot be changed through a direct operation of a user. Further, in a case of the feedback type, what is displayed on a page is the set contents, and thus, there is no direct relationship between the displayed contents and a display attribute of each option. However, the set contents may be determined according to a display attribute, and in this point, it may be said that there is a relationship between the displayed contents and a display attribute of each option. In FIG. 8, such a state is depicted that "many page original" is set as setting item.

The "non-display type" is such that, regardless of the contents of an option and a value of a display attribute, no display corresponding to a selection operating part is carried out on a page at all. FIG. 8 depicts a frame of a broken line. However, actually, even such a frame is not displayed. The non-display type may be used for a case where usage of a certain function is made not possible at all.

Each of the feedback type and the non-display type is designated in a case where reception of an operation by a user to change setting is not necessary. The feedback type is preferable in a case where an option other than an option of "turning off a function" is automatically set. The non-display type is preferable in a case where an option of "turning off a function" is automatically set. However, in a case where these types are to be designated, conditions may be complicated, and details will be described later.

Next, priority setting information Ip included in page data depicted in FIG. 7 will be described.

Priority setting information Ip indicates the contents of modifying a setting in the image processing apparatus 10 for the purpose of eliminating a contradiction which may occur between the display contents on a page based on image configuration information Ic and the set contents actually set in the image processing apparatus 10.

A contradiction means, for example, that, although such setting is carried out that no display should be carried out on a GUI page for a specific function (i.e., a type attribute of a selection operating part is the "non-display type"), the corresponding function is turned on, that, although such setting is carried out that no display should be carried out on a GUI page for a button corresponding to a specific option of a specific function (i.e., a display attribute of the option is the "not being displayed"), such setting is carried out that the option is selected for the function, or such. That is, a contradiction means that, such setting is carried out in the image processing apparatus 10, that, for the setting, display of a GUI page according to the page configuration information Ic cannot be carried out.

FIG. 9 depicts an example of a priority information setting table prescribing the contents of priority setting information.

In page data, priority setting information is included having a form of such a priority setting information table as that depicted in FIG. 9. As depicted in FIG. 9, priority setting information includes information of an order, an option (i.e., "page component") and the set contents (i.e., "setting").

The "order" denotes an order of registration of information in the priority setting information. When the set contents in the image processing apparatus 10 are to be modified, a modification is carried out according to the order. The "option" denotes data indicating which option of which selection operating part a modification is to be carried out. The "set contents" denotes data indicating whether a corresponding option is set as being "turned on" (i.e., "ON") or being "turned off" (i.e., "OFF").

Therefore, in an example of FIG. 9, such modifications are prescribed that, setting of "turning off" is carried out for an option 1-A (i.e., an option "A" of a "first" selection operating part), and then, setting of "turning on" is carried out for an option 2-B (i.e., an option "B" of a "second" selection operating part, and the same manner being applied hereinafter).

It is noted that, a modification of the set contents according to the priority setting information may be carried out, for example, in a case where a set of the set contents are read out from the macro DB 151, and the image processing apparatus 10 is set according to the read contents, in a case where a set of commands are read out, and the set contents of the image processing apparatus 10 are changed according to the commands, in a case where a set of page data used to display a GUI page is changed for displaying on another GUI page, or such.

In the image processing apparatus 10, in a case where the above-mentioned process is carried out, priority setting information is read out from a set of page data currently being used or to be newly used, and the set contents are modified according to the priority setting information.

At this time, along with a modification prescribed in the priority setting information, the set contents of another option may be modified together. For example, in a selection operating part of the "one being selected" type or the "selection type", in a case where another option is turned on rather than an option which has been selected before the modification, the option which has been selected before the modification should be turned off accordingly. Further, in a selection operating part in the "one being selected type", in a case where an option having been selected before the modification is turned off, any other option should be turned on accordingly. Further, there may be a case where, along with a modification of the set contents of a certain setting item, the set contents of another setting item should be modified.

In the embodiment, the above-mentioned change of a setting is carried out appropriately if necessary each time when a modification for one option according to priority setting information is carried out.

Figure 10:
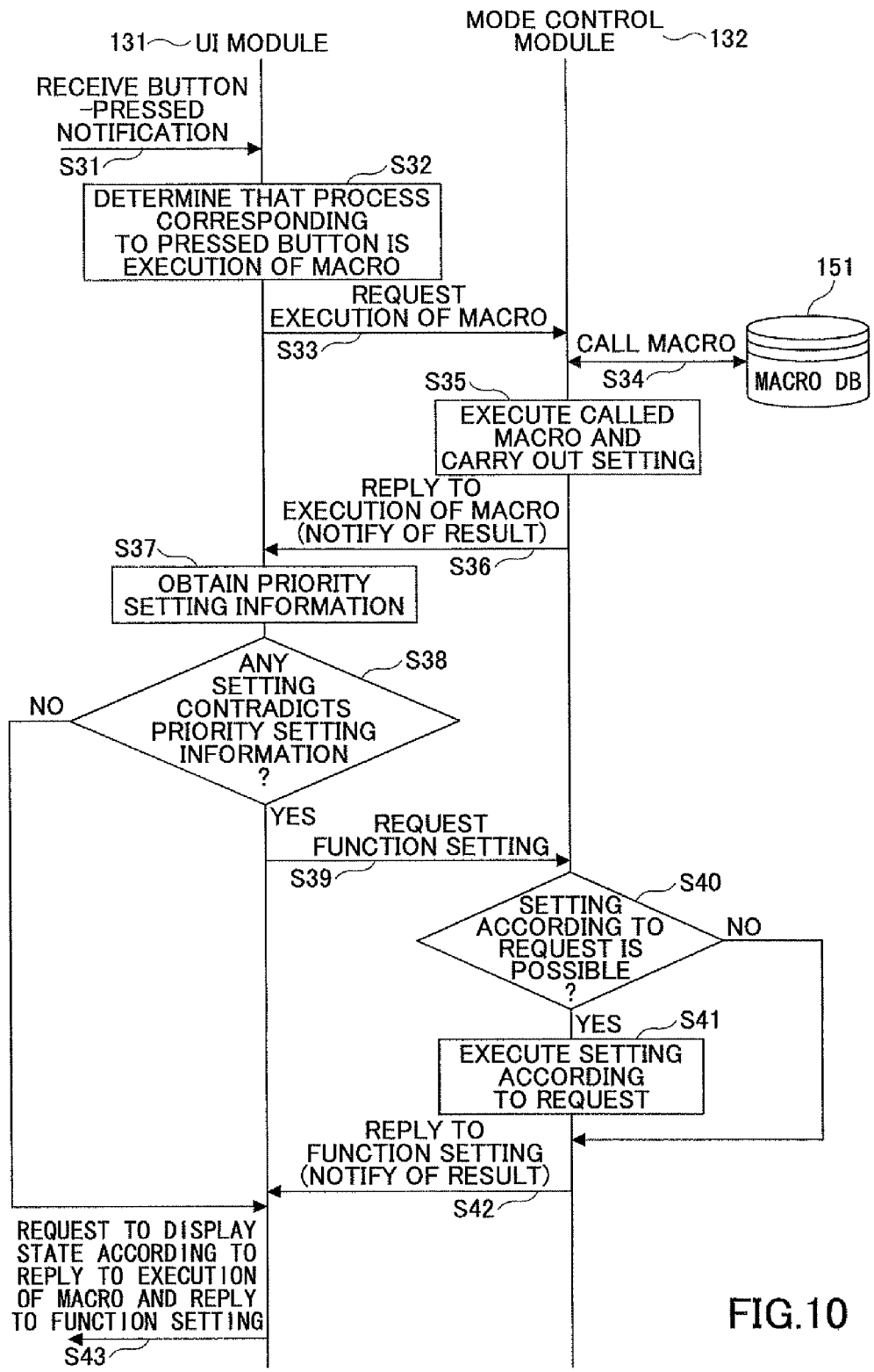
FIG. 10 depicts an operation sequence of the UI module and the mode control module in a case where it is directed to execute a macro in the image processing apparatus depicted in FIG. 1.

Next, FIG. 10 depicts, as one example of a process concerning a modification of the set contents according to priority setting information, an operation sequence of the UI module 131 and the mode control module 132 in a case where it is directed to execute a macro. The process is one specific example of the process depicted in FIG. 3 or FIG. 6.

In this process, the UI module 131 receives button pressing notification from the panel control part 121 or the UI customization control part 141 (step S31). Then, when determining that a process corresponding to the pressed button is to execute a macro (step S32), the UI module 131 determines that it is directed to execute the macro, and requests the mode control module 132 to execute the macro (step S33).

In response thereto, the mode control module 132 responds to the request and calls the macro concerning the request (step S34) by accessing the macro DB 151, executes commands included in the macro in sequence, and thus changes the set contents in the image processing apparatus 10 (step S35). Then, the mode control module 132 sends an execution result to the UI module 131 as a reply to the macro execution request (step S36).

When receiving the reply, the UI module 131 obtains priority setting information included in page data of each page concerning a set of pages currently used for displaying a GUI in the image processing apparatus 10 (step S37).

Then, for an option for which the contents of the priority setting information are different from the set contents set as a result of the execution of the macro (YES in step S38), the UI module 131 requests the mode control module 132 to set a function to modify the set contents, and requests the mode control module 132 to carry out setting according to the priority setting information (step 339). The above-mentioned determination and request are carried out for each option according to the order designated in the priority setting information table, concerning information included in the single priority setting information table.

The mode control module 132 carries out setting according to the request when the setting according to the request is allowed, the same as in steps S14 through S16 of FIG. 3, and after that, sends a reply to the UI module 131 (steps S40 through S42).

Further, for an option for which the contents of the priority setting information agree with the set contents set obtained as a result of the execution of the macro in step S38, no modification of the set contents is carried out.

Then, when receiving a reply from the mode control module 132 indicating that necessary modifications for all the priority setting information have been completed or modifications are not allowed, the UI module 131 requests a display of a state according to the macro execution reply and the function setting reply, the same as in step S17 of FIG. 3, to a transmission source of the button-pressed notification of step S31 in step S43 of FIG. 10.

Through the above-mentioned process, the image processing apparatus 10 calls the macro according to an operation carried out by a user on the operation panel 18, executes the macro, and also, modifies the set contents, if necessary, so that the set contents set as a result of the execution of the macro do not contradict the display contents of the GUI.

It is noted that, in step S40, when there is an item for which setting according to the priority setting information is not allowed, such a warning may be given to a user that there is a possibility that a setting which is not displayed on the page has been carried out. Alternatively, the execution of the macro may be undone, and thus, a state before the execution of the macro may be restored.

Figure 11:
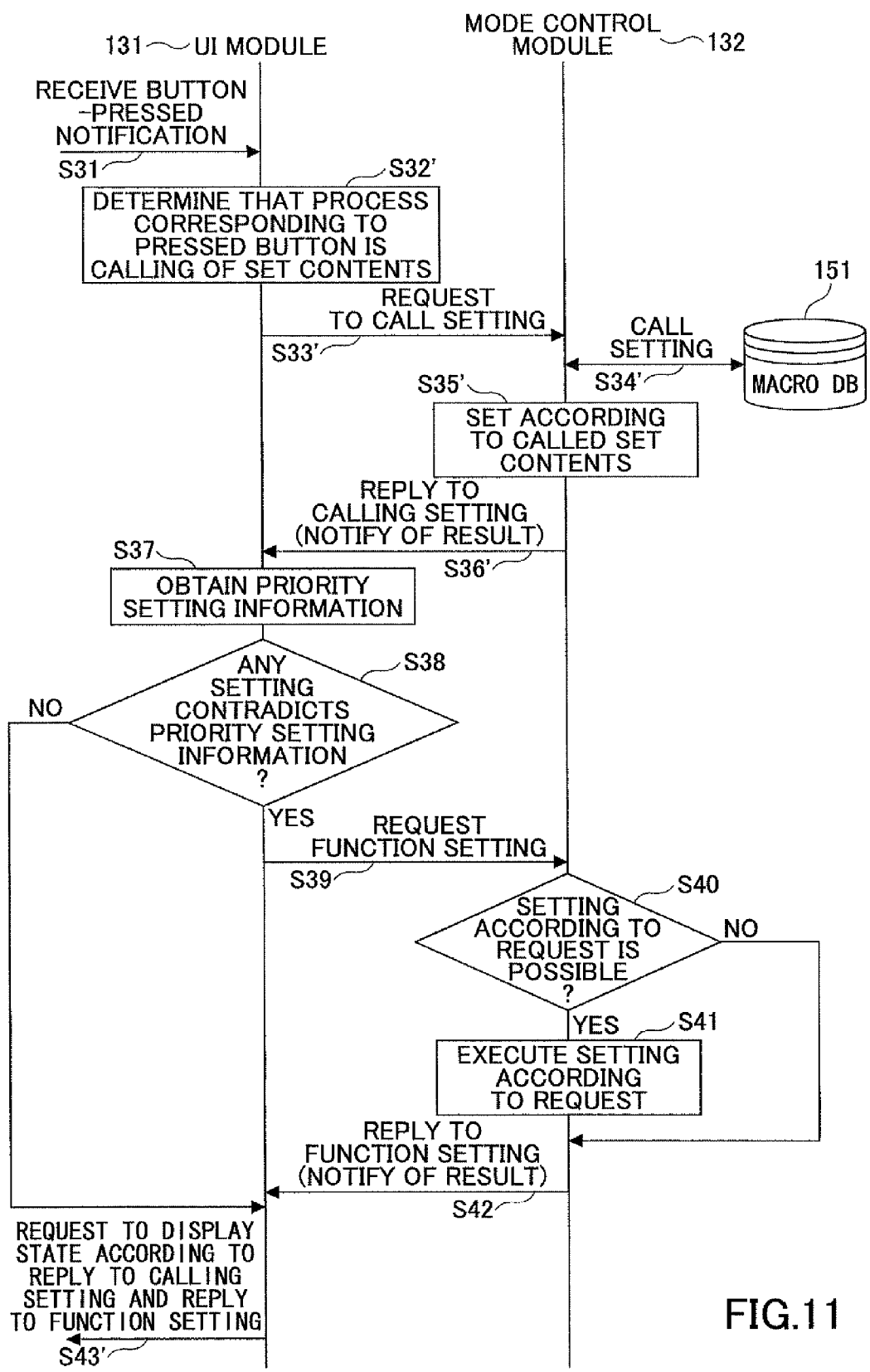
FIG. 11 depicts an operation sequence of the UI module and the mode control module in a case where it is directed to call set contents in the image processing apparatus depicted in FIG. 1.

Next, FIG. 11 depicts, as another example of a process concerning a modification of the set contents according to priority setting information, an operation sequence of the UI module 131 and the mode control module 132 in a case where it is directed to call the set contents. As the process is approximately identical to the process of FIG. 10, only different points will be described.

In this process, the UI module 131 determines that a process corresponding to a button concerning a given button pressing notification is to call the set contents (step S32'), and requests the mode control module 132 to call the set contents (step S33').

In response thereto, the mode control module 132 responds to the request, accesses the macro DB 151, calls the set contents (i.e., a set of parameter values) concerning the request (step S34'), and carries out setting according to the called set contents (step S35'). Here, actually, the called set contents may be copied, as they are, to a memory area provided for storing the current set contents.

Then, the mode control module 132 sends a reply to the UI module 131 an execution result as a reply to the calling request (step S36').

A process subsequent thereto is the same as that in the case of FIG. 10, and the set contents are modified when the set contents set as a result of the calling contradicts the priority setting information. Namely, steps S37, S38, S39, S40, S41, S42 and S43 of FIG. 10 correspond to steps S37, S38, S39, S40, S41, S42 and S43' of FIG. 11 respectively.

Through the above-mentioned process, the image processing apparatus 10 responds to an operation carried out by a user to the operation panel 18, calls the set contents previously stored, reflects the called set contents on operation of the image processing apparatus 10, and also, modifies, if necessary, the set contents so that the set contents obtained as a result of the calling do not contradict the display contents of the image processing apparatus 10.

Figure 12:
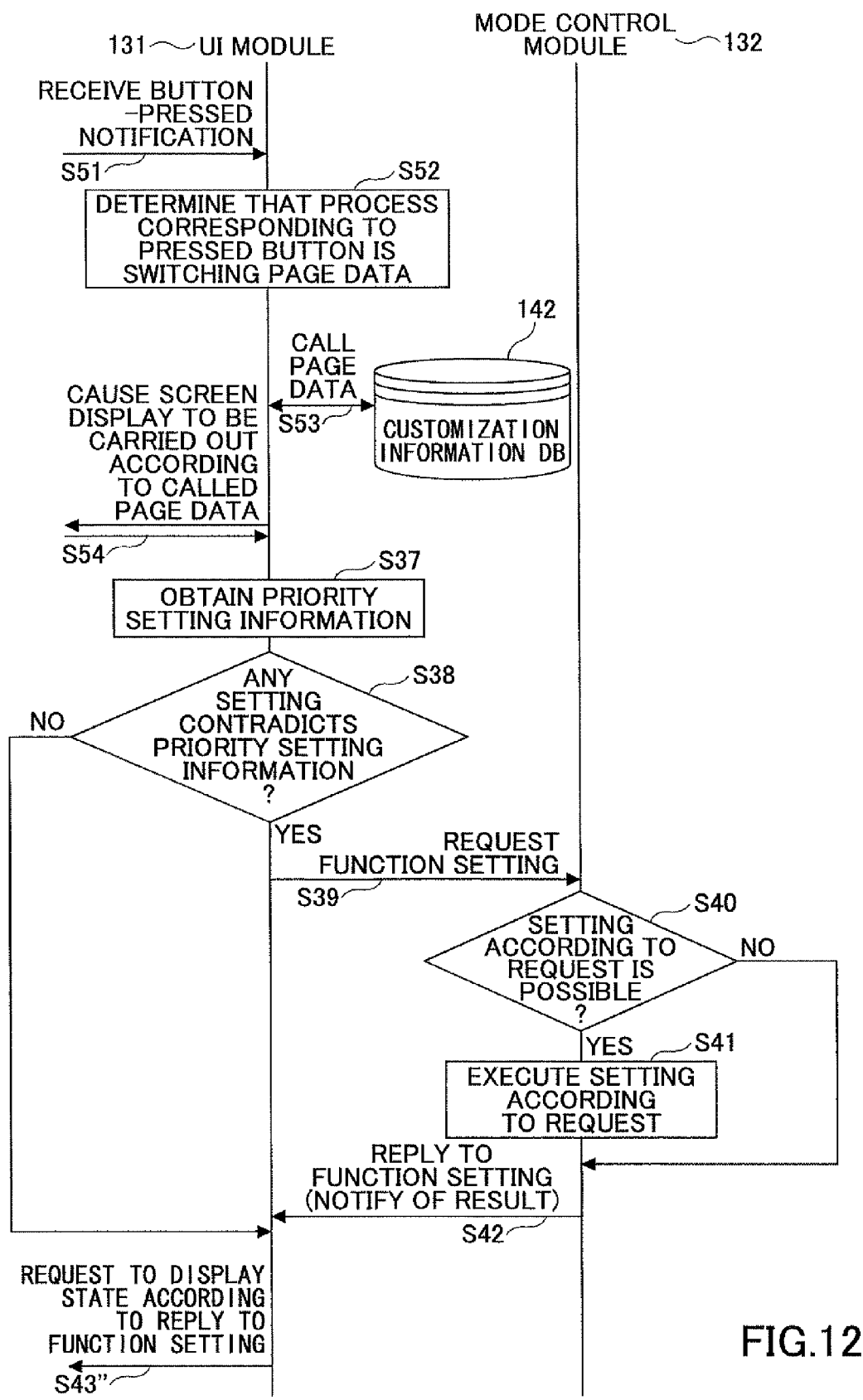
FIG. 12 depicts an operation sequence of the UI module and the mode control module in a case where it is directed to switch page data in the image processing apparatus depicted in FIG. 1.

Next, FIG. 12 depicts, as yet another example of a process concerning a modification according to priority setting information, an operation sequence of the UI module 131 and the mode control module 132 in a case where it is directed to switch a set of pages.

In the process, the UI module 131 receives a button-pressed notification from the panel control part 121 or the customization control part 141 (step S51). Then, when determining that a process corresponding to a button concerning the button-pressed notification is to switch a set of pages (step S52), the UI module 131 determines that it is directed to switch a set of pages, and calls page data concerning the set of pages to be newly used, from the customization DB 142 (step S53).

Then, the UI module 131 requests a transmission source of the button-pressed notification to display a GUI page according to the called page data, and causes the transmission source to carry out the display (step S54). The GUI page to be displayed at this time may be a predetermined initial page of the set of pages, or a page of the set of pages corresponding to a page which has been displayed at the time of the request.

After that, the same as in the case of step S37 and the subsequent process of FIG. 10, a modification of the set contents according to the priority setting information is carried out. Namely, steps S37, S38, S39, S40, S41, S42 and S43 of FIG. 10 correspond to steps S37, S38, S39, S40, S41, S42 and S43" of FIG. 12 respectively. In this case, the set contents are not changed as a result of switching of the set of pages itself. However, the priority setting information is to be changed as a result of switching of the set of pages. As a result of the change of the priority setting information, the set contents may contradict the contents of the priory setting information concerning the set of pages set after the change. Therefore, the set contents are modified, if necessary, according to the priority setting information.

Through the above-mentioned process, when changing the page data used for displaying a GUI page, the image processing apparatus 10 modifies, if necessary, the set contents so that, if the set contents having been set until then contradict the display contents in the GUI set as a result of the change of the page data, the contradiction is eliminated.

Next, a function of the PC 40 concerning editing page data will be described.

Figure 13:
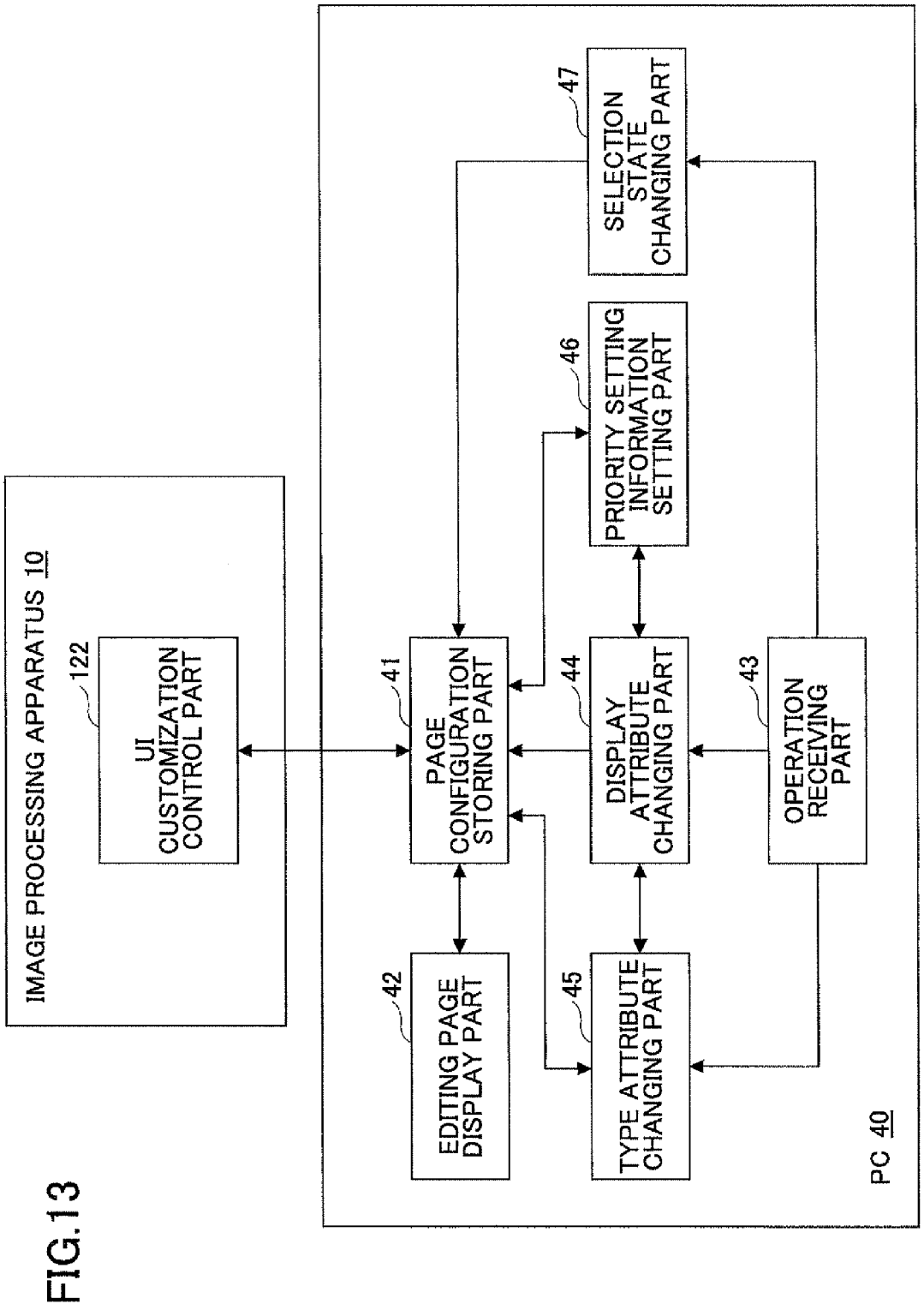
FIG. 13 depicts a function block diagram of functions which the PC depicted in FIG. 1 has, as acting as the screen editing apparatus.

First, FIG. 13 depicts a function block diagram for functions of the PC 40 as the screen editing apparatus.

The PC 40 has functions of a page configuration storing part 41, an editing page display part 42, an operation receiving part 43, a display attribute changing part 44, a type attribute changing part 45, a priority setting information setting part 46 and a selection state changing part 47, depicted in FIG. 13, by executing the client application provided for carrying out a screen editing function.

The page configuration storing part 41 acts as an attribute storing part which stores page data depicted in FIG. 7, and stores, at least a type attribute of each selection operating part, a display attribute of each option of the selection operating part and priority setting information indicating contents of modifying a setting, to be carried out according to the page data. Further, the page configuration storing part 41 has a function of obtaining page data currently used by the image processing apparatus 10, from the UI customization control part 122, and a function of transferring page data having been edited to the UI customization control part 122 and causing the page data to be set in such a state that the page data is used for displaying a GUI in the image processing apparatus 10.

The editing page display part 42 has a function of displaying the GUI editing page 200 depicted in FIGS. 5A, 5B and 5C on a display device. A display of the preview display part 230 is carried out according to the contents of the page configuration storing part 41, and, when the contents are changed, the change of the contents is reflected on the display of the page in a real time manner.

The operation receiving part 43 has a function of receiving a page editing operation of a user such as, on the GUI editing page 200, selection of page or button to be edited, inputting an instruction to change an attribute with the use of a display button 261, a not-display button 262 or such. Such an operation may be received by means of a keyboard, a mouse or such.

The display attribute changing part 44 has a function of changing the contents of page configuration information stored by the page configuration storing part 41 according to an instruction to change in a case where the operating receiving part 42 has received the instruction to change a display attribute. Further, the display attribute changing part 44 has a function of notifying the type attribute changing part 45 and the priority setting information setting part 46 of the contents of the change.

The type attribute changing part 45 has a function of changing a value of a type attribute of a selection operating part having an option, into an appropriate value in consideration of various conditions, the value being stored in the page configuration storing part 41, in a case where such notification has been carried out by the display attribute changing part 44 that a display attribute of the option included in the page configuration information has been changed. What value is set in consideration of what conditions will be described later in detail.

The priority setting information setting part 46 has a function of determining whether it is necessary to add to priority setting information according to a value of a type attribute of a selection operating part having an option and a selected or non-selected state of the option in a case where such notification has been carried out by the display attribute changing part 44 that a display attribute of the option included in the page configuration information has been changed. When determining that it is necessary to add to the priority setting information, the priority setting information setting part 46 adds new information concerning the option to the priority setting information included in page data stored by the page information storing part 41. What priority setting information is added in consideration of what conditions will be described later in detail.

It is noted that, in the embodiment, priority setting information is automatically generated by the priority setting information setting part 46. However, such a configuration may be provided that a user can manually carry out a change on the priority setting information at a later time.

The selection state changing part 47 has a function of changing a selection attribute included in the page data stored by the page configuration storing part 41, into the contents indicating an option (which may be an option of "turning off a function") which is currently selected in each selection operating part, according to an operation carried out by a user in the page operation mode of the GUI editing page 200.

Further, although omitted in FIG. 13, the PC 40 has a function of changing various contents other than the above-mentioned respective attributes, included in the page configuration information of the page data stored by the page configuration storing part 41, according to an operation carried out by a user and received by the operation receiving part 43.

Thus, with the use of the PC 40 acting as the screen editing apparatus, it is possible to prescribe a display type of a selection operating part by a type attribute. Also, in a case where a display attribute of an option is to be changed from the GUI editing page 200, a type attribute of a selection operating part having the option and information according to the option and a selected or non-selected state of an operating part corresponding to the option are set as priority setting information.

Next, a process carried out by the PC 40 for the above-mentioned setting, and specific examples of the setting of priority setting information obtained from the process will be described.

Figure 14:
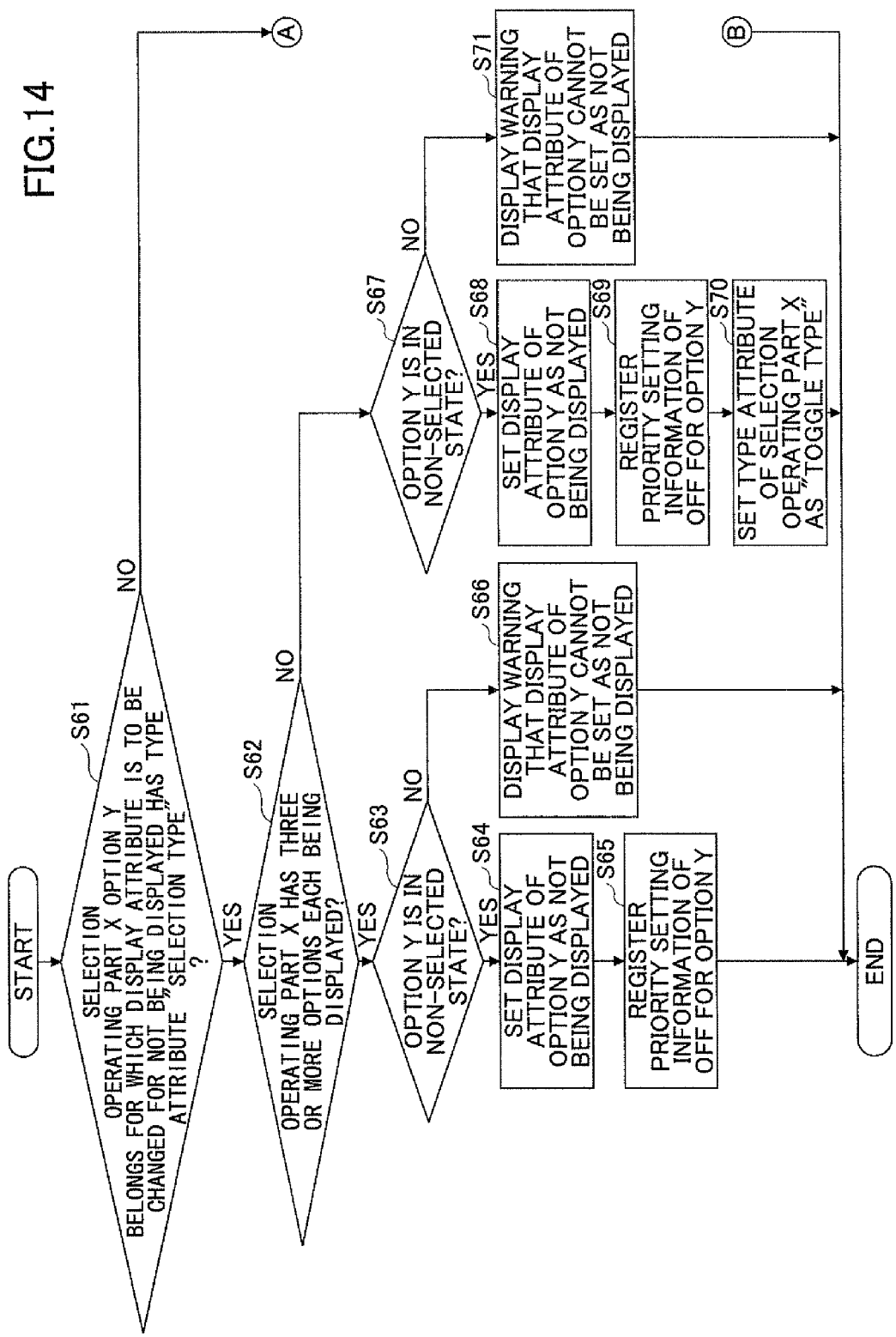
FIGS. 14, 15 and 16 depict a flowchart of a priority setting information setting process executed by the PC depicted in FIG. 1.
Figure 15:
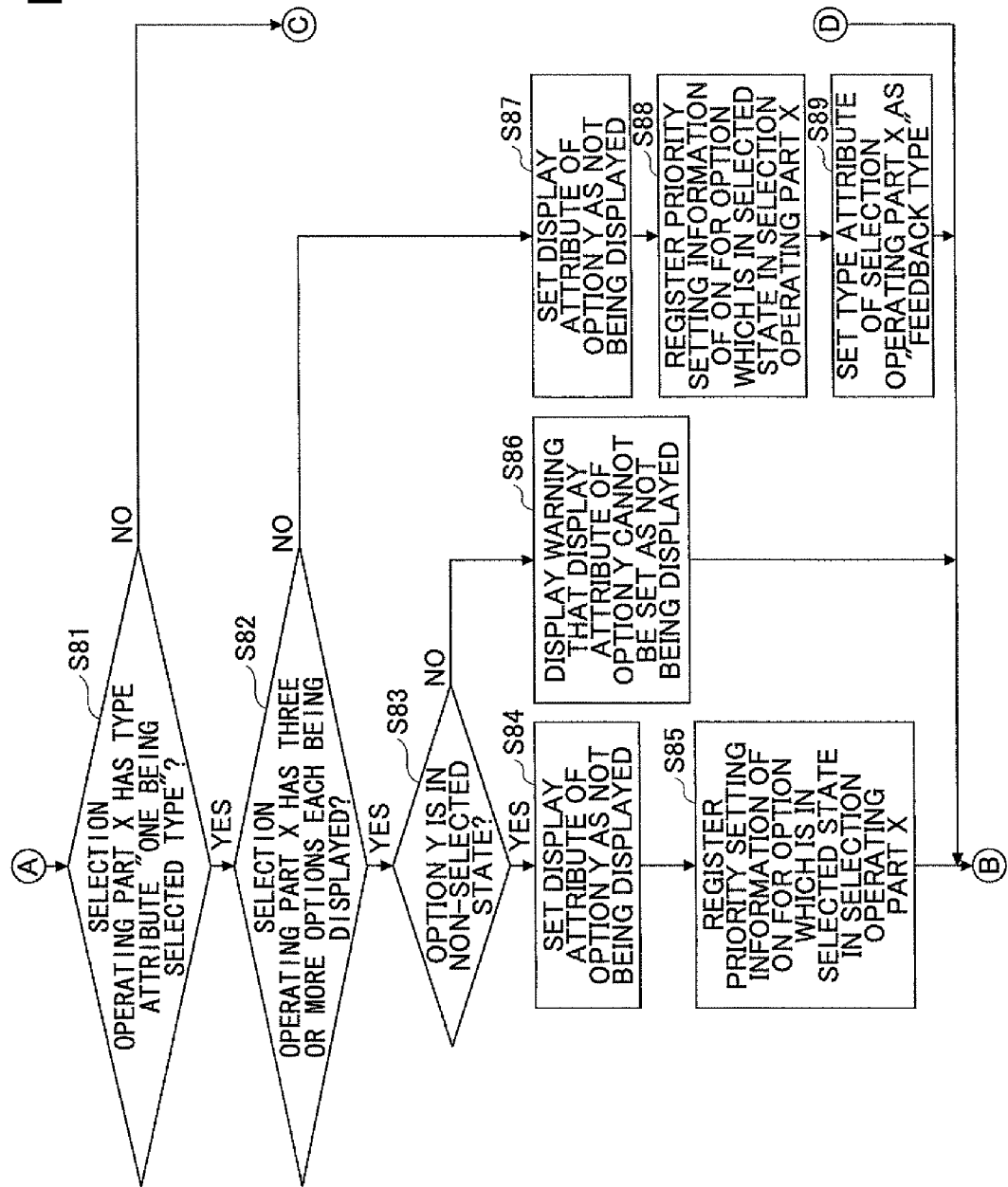
Figure 16:
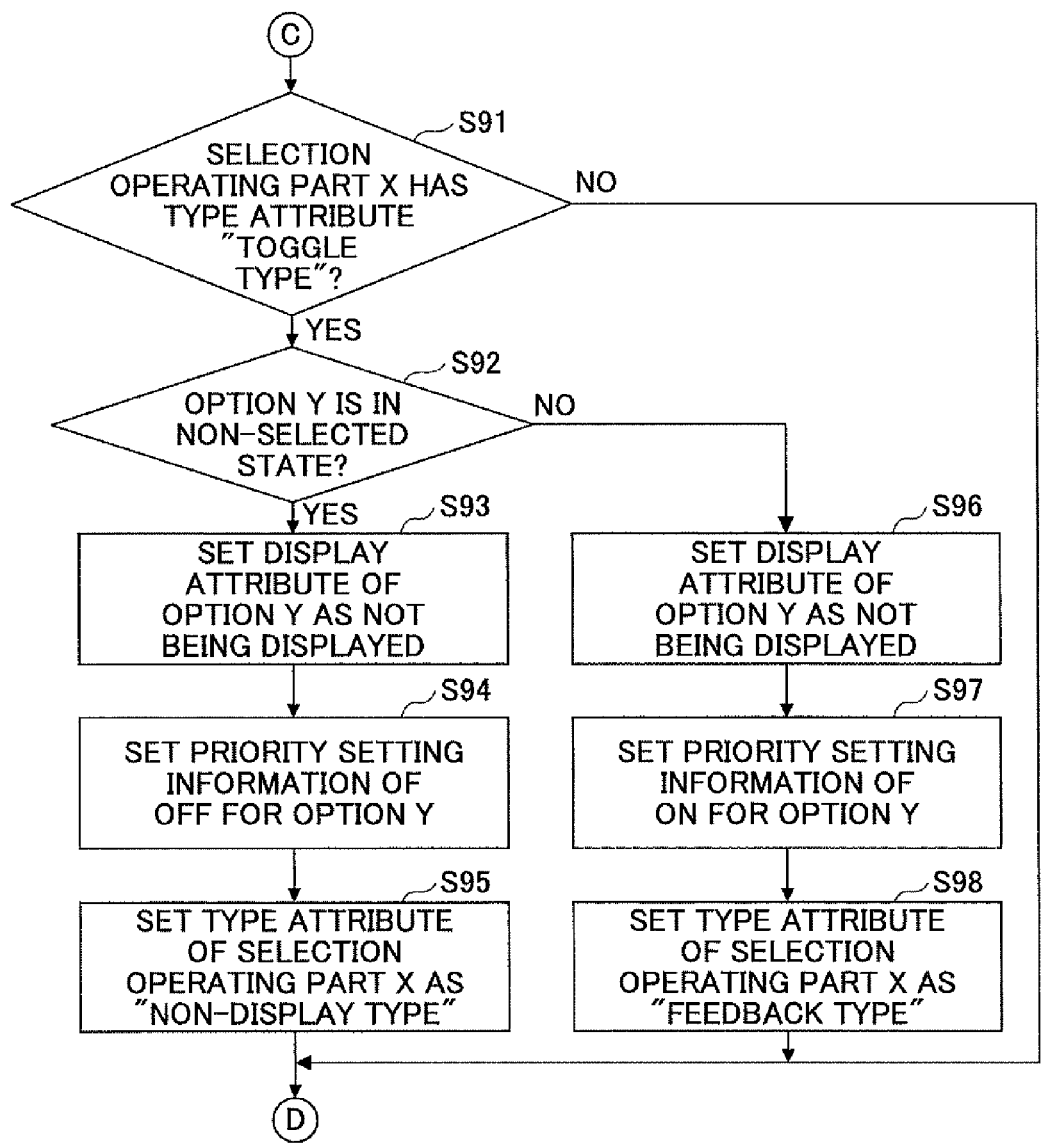

FIGS. 14 through 16 depict flowcharts of the priority setting information setting process carried out by the PC 40.

The process is carried out by the CPU of the PC 40 acting as the screen editing apparatus in a case where, during execution of the client application, such an instruction is detected that a display attribute of any option in the GUT editing page 200 is to be changed into "not being displayed". The process not only includes processes such as the setting of priority setting information, but also a change of a display attribute according to the received instruction, and a change of a type attribute of a selection operating part.

In the priority setting information setting process, the CPU of the PC 40 determines in step S61 of FIG. 14 whether a type attribute of a selection operating part (referred to as a selection operating part X), including an option (referred to as an option Y) for which the instruction to change a display type to "not being displayed" has been given, is the "selection type".

When the type attribute is the "selection type", step S62 is carried out. In step S62, it is then determined whether the number of options of the selection operating part X each having a display attribute of "being displayed" is three or more. When the number of the options is three or more, step S63 is carried out. In step S63, it is determined whether the option Y is in a non-selected state. When the option Y is in a non-selected state, step S64 is carried out. In step S64, a display attribute of the option Y is set as "not being displayed", and also, in step S65, priority setting information setting the option Y as being turned off is registered, and the process is finished.

Thus, in a case where such an instruction is given that an option of a selection operating part of the "selection type" is changed into "not being displayed", it can be expected that a user's intention is that selection of the option should be made not possible.

A specific example is depicted in FIGS. 17A and 17B, among options IcA, IcB, IcC and IcOFF of the selection operating part IcX, a display attribute Ad of the option C IcC is changed into "not being displayed", and selection of a "staple C" corresponding to the option C icC is made not possible, for example.

Therefore, when the display attribute Ad is changed according to the user's instruction, it may be preferable that priority setting information is registered in addition, and therewith, setting of the option having been thus set as "not being displayed" cannot be carried out consequently when the page data is used. Through the above-mentioned process, the above-mentioned preferable operation is carried out.

Further, in a case where the option Y is in a selected state in step S63, step S66 is carried out, a warning that a display attribute of the option Y cannot be set as "not being displayed" is displayed, and the process is finished with a value of the display attribute not being changed. In this case, the change of the display attribute is thus canceled.

It can be expected that for an option in a selected state, a user wishes to make it possible to select the option. Therefore, such an instruction to change into "not being displayed" contradicts the wish, and thus, it can be expected that the instruction results from the user's erroneous operation. Therefore, regardless of user's instruction, the display attribute is not changed as mentioned above.

Figure 18:
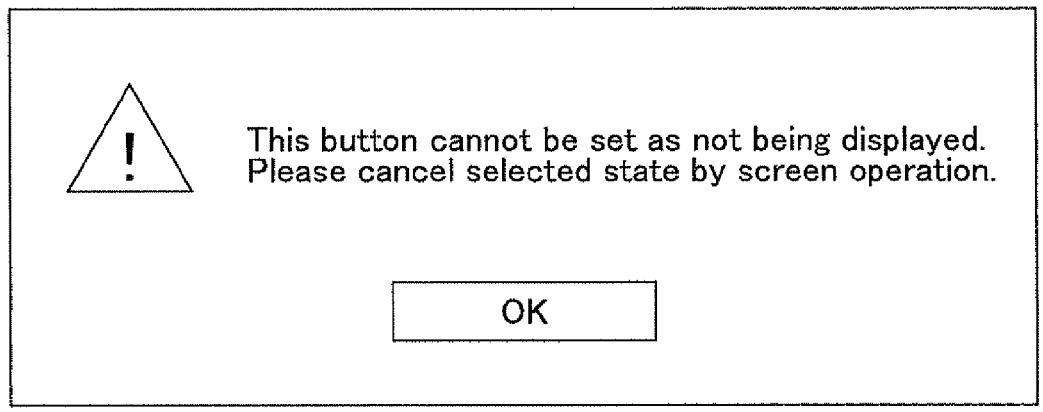
FIG. 18 depicts a specific example of a warning display in the process depicted in FIG. 14.

FIG. 18 depicts an example of the warning display. The contents of the warning display indicate a prohibited matter and how to avoid the prohibited matter. That is, in order to set an option according to the user's instruction, the user is requested to first cancel a selected state of a button corresponding to the option.

Through the process of steps S61, S62, S63, S64, S65 and S66 of FIG. 14, it is possible to prevent a change of a display attribute or a registration of priority information, which results from a user's erroneous operation and which is not intended by the user.

In a case where step S62 results in NO, since at least two buttons are necessary in a selection operating part having a type attribute of the "selection type", it can be expected in this case that the number of options each of "being displayed" in the selection operating part X is 2. Then, in this case, step S67 is carried out, and it is determined whether the option Y is in a non-selected state. When the option Y is in a non-selected state, step S68 is carried out, and a display attribute of the option Y is set as "not being displayed", and also, in step S69, such priority setting information is registered for such setting of turning off the option Y. Further, in step S70, a type attribute of the selection operating part X is set as the "toggle type", and the process is finished.

The above-mentioned process is the same as in the case of steps S64 and S65. However, in the case where the number of options each of being displayed is 2, when a display attribute of one thereof is set as "not being displayed", the number of options each of "being displayed" becomes only 1, and it is not appropriate to maintain the type attribute of "selection type". Therefore, the process of changing the type attribute to the "toggle type" is added as mentioned above.

As FIGS. 19A and 19B depict a specific example, in a case where an option B IcB is changed into "not being displayed", and thus, the number of the remaining options each of "being displayed" is only an option A IcA, selection of "staple 2" corresponding to the option B is made not possible, and also, a type attribute of a selection operating part is changed to the "toggle type". Hatching of oblique lines in FIG. 19B denotes a change of setting carried out resulting from a change of setting indicated by halftone dots.

Through the process of steps S67, S68, S69 and S70 of FIG. 14, in addition to advantages in the case of steps S64 and S65, such an advantage can be obtained that setting of a type attribute of a selection operating part is automatically changed to an appropriate one.

Further, in a case where the option Y is in a selected state in step S67, step S71 is carried out, a warning that a display attribute of the option Y cannot be set as "not being displayed" is displayed, and the process is finished with a value of the display attribute not being changed. This process has the same purpose as that in the case of step S66.

Further, in a case where a type attribute is not the "selection type" in step S61, step S81 of FIG. 15 is then carried out. In step S81, it is determined whether a type attribute of the selection operating part X concerning the instruction to change a display attribute is a "one being selected type".

When a type attribute is the "one being selected type", step S82 is carried out, and it is determined whether the number of options each of "being displayed" of the selection operating part X is three or more. When the number is three or more, step S83 is carried out, and it is determined whether the option Y concerning the instruction to change a display attribute is in a non-selected state. When the option Y is in a non-selected state, step S84 is carried out, and a display attribute of the option Y is set as "not being displayed". Also, in step S85, priority setting information is registered for setting to turn off an option in a selected state in the selection operating part X. Then, the process is returned to FIG. 14 and is finished. It is noted that in a case of the "one being selected type", any one option of a selection operating part should be necessarily in a selected state.

Thus, in a case where such an instruction is given that an option of a selection operating part of the "one being selected type", a user's intention can be expected such that, selection of the option should be made not possible, or selection of the option should not be cancelled. Further, in a state in which the number of selectable options is three or more, the former intention has a higher possibility.

As FIGS. 20A and 20B depict a specific example, an option A IcA is changed into "not being displayed", and selection of "automatic color" corresponding to the option A is made not possible.

Therefore, when a display attribute is changed according to a user's instruction, it may be preferable that priority setting information is registered in addition, and, when page data is used, an option in a selected state should necessarily be selected when it is directed to change a display attribute into "not being displayed". Through the above-mentioned process, the preferable option can be carried out.

Further, in a case where the option Y is in a selected state in step S83, step S86 is carried out, and such a warning is displayed that setting of a display attribute of the option Y into "not being displayed" is not possible. Then, the process is finished with a value of a display attribute not being changed. The contents of the display may be the same as those in the case of steps S66 and S71 of FIG. 14.

Even in a case of the "one being selected type", it can be expected that, for an option in a selected state, a user wishes to make it possible to select the option. Therefore, it can be expected that such an instruction to change into "not being displayed" contradicts the user's wish, and results from an erroneous operation. Therefore, regardless of the user's instruction, a change of a display attribute is not carried out.

Through the process of steps S81, S82, S83, S84, S85 and S86 of FIG. 15, it is possible to avoid a change of a display attribute or a registration of priority setting information, which results from an erroneous operation and is not intended by a user.

Next, when a result of step S82 is NO, since at least two buttons are necessary also for a selection operating part having a type attribute of the "one being selected type", it is expected in this case that the number of options each of being displayed" is 2 in the selection operating part X. Then, in this case, step S87 is carried out, a display attribute of the option Y is set as "not being displayed", also, in step S88, priority setting information for setting to turn on an option of a selected state included in the selection operating part X is registered, and further, in step S89, a type attribute of the selection operating part X is set as the "feedback type". Then, the process is returned to FIG. 14 and the process is finished.

A user's instruction to set one option of selectable options as "not being displayed" in such a state that the number of the selectable options is 2 can be interpreted that the user does not wish cancellation of selection of a currently selected option. That is, it can be expected that the user wishes to fix the selection of the currently selected option. This is because, in the selection operating part in the "one being selected type", when the number of remaining selectable options becomes 1, this means that the one option should necessarily be selected, and also, it can be expected that the user wishes to select the option which is currently in a selected state.

As FIGS. 21A and 21B depict a specific example, also in a case where any one of two options is set as "not being displayed", a type attribute of a selection operating part X is changed to the "feedback type", and also, priority setting information is generated for setting to turn on an option of a selected state. Through the process, it is possible to carry out setting according to the above-mentioned user's intention.

It is noted that, in the "feedback type", no button for receiving a user's setting is displayed. Therefore, the same contents are displayed when any one of the options is set as "being displayed". Further, since an option is selected according to the priority setting information, a specific option is selected at any time without regard to values of display attributes of the options.

Further, in a case where a type attribute is not the "one being selected type" in step SS1, step S91 in FIG. 16 is carried out. In step S91, it is determined whether a type attribute of the selection operating part X concerning the instruction to change a display attribute is the "toggle type". When the type attribute is the "toggle type", step S92 is carried out, and it is determined whether the option Y concerning the instruction to change a display attribute is in a non-selected state. When the option Y is in the non-selected state, step S93 is carried out.

In step S93, a display attribute of the option Y is set as "not being displayed", priority setting information is registered in step S94 for setting to turn off the option Y, a type attribute of the selection operating part X is changed into the "non-display type" in step S95, the process is returned to FIG. 15 and FIG. 14, and the process is finished.

On the other hand, when the option Y is in a selected state in step S92, step S96 is carried out. In step S96, a display attribute of the option Y is set as "not being displayed", priority setting information is registered in step S97 for setting to turn on the option Y, a type attribute of the selection operating part X is changed into the "feedback type" in step S98, the process is returned to FIG. 15 and FIG. 14, and the process is finished.

In a case of the "toggle type", the number of options each of "being displayed" is only one in a selection operating part. Therefore, when the option is changed into "not being displayed", no button is displayed for the selection operating part. Further, an intention of a user who wishes such a change can be expected that a current set state is kept, and should not be changed. In other words, the user's intention can be expected that, in a case where an option is in a selected state at a time of the change, the selected state should be kept so that a function concerning the option can be used at any time, and, in a case where an option is in a non-selected state at a time of the change, the selected state (turning off a function) should be kept so that usage a function concerning the selection operating part should be avoided.

Therefore, as in steps S94 and S97, such priority setting information is registered that, for an option for which it is instructed to change a display attribute into "not being displayed", the option is set as being turned on or off according to a selected or non-selected state of the option. Thereby, it is possible to carry out setting reflecting the user's intention.

Further, in order to fix a non-selected state, since it will be not necessary to carry out any display for a corresponding selection operating part and receive any operation of a user, it is appropriate to set a type attribute as the "non-display type", and thus, an unnecessary display should be avoided. On the other hand, in order to fix a selected state, it will be not necessary to receive any operation of a user for a corresponding selection operating part. However, in this case, it is preferable to make it possible for the user to see the set contents. Therefore, it is appropriate to set a type attribute as the "feedback type".

FIGS. 22A, 22B, 23A and 23B depict specific examples of the above-mentioned setting change operations.

Figure 22A:
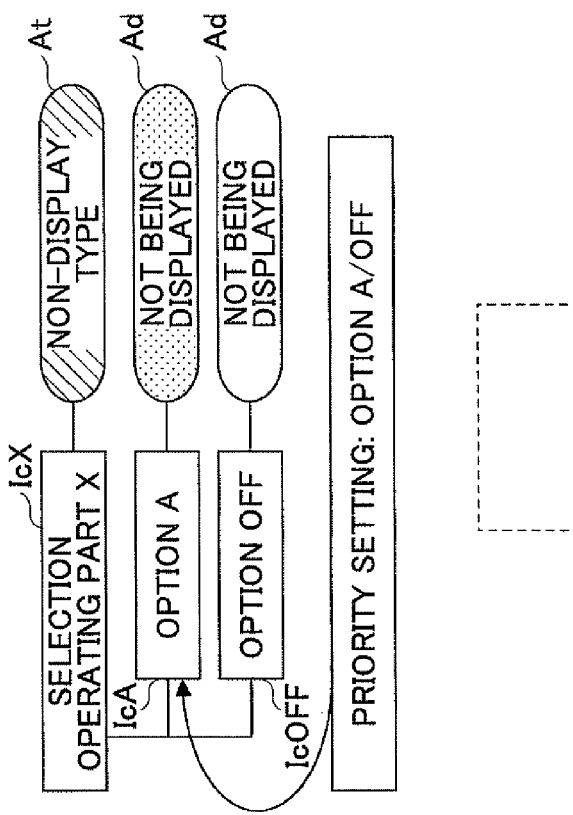
FIGS. 22A and 22B depict a specific example of changing a setting in the process depicted in FIG. 16.
Figure 22B:
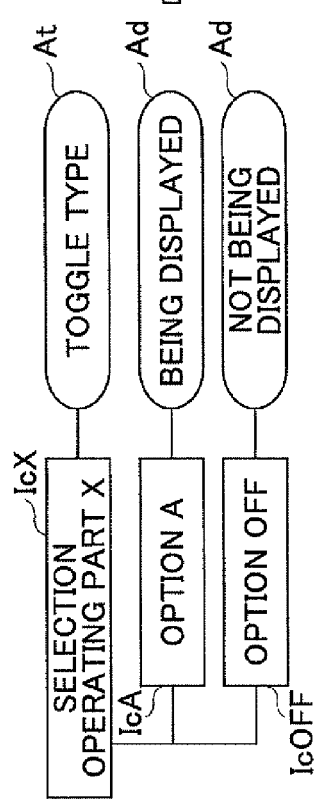

An example of FIGS. 22A and 22B is such that, in a case where a button concerning an option A IcA is in a non-selected state, a display attribute of the option A is changed into "not being displayed". In this case, as a result of a registration of priority setting information and a change of a type attribute of the selection operating part X, no operation of a user concerning a function of the selection operating part X is allowed at all, and no display is carried out.

An example of FIGS. 23A and 23B is such that, in a case where a button concerning an option A IcA is in a selected state, a display attribute of the option A is changed into "not being displayed". In this case, as a result of a registration of priority setting information and a change of a type attribute of the selection operating part X, no operation of a user concerning a function of the selection operating part X is allowed at all. A selection of the option A is valid at any time, and a corresponding display is carried out.

It is noted that, in these examples, for the selection operating part X IcX, other than two options IcA and IcOFF depicted in FIGS. 22A, 22B, 23A and 23B, a further one or a plurality of options each having a display attribute of "not being displayed" may be included. In this case, it can be expected that, in the process of step S64 of FIG. 14 or such, priority setting information is already registered for turning off these options.

Further, in a case where a type attribute of the selection operating part X is not the "toggle type" in step S91, that is, the type attribute is the "feedback type" or the "non-display type", no change of an attribute value is carried out, the process is returned to FIG. 15 and FIG. 14, and the process is finished. This is because, in cases of these types, it can be expected that no more option, for which a display attribute is changed to "not being displayed", exists accordingly.

As described above, in a case where it is directed by a user to change a display attribute of any option on the GUI editing page 200 to "not being displayed", the PC 40 acting as the screen editing apparatus executes the process depicted in FIGS. 14, 15 and 16, and thus, not only changes an attribute value if necessary, but also automatically carries out appropriate setting if necessary to reflect a user's editing intention.

Especially, priority setting information having the appropriate contents is provided, and, the set contents are modified according to the contents of the priority setting information if necessary, when page data on being edited is used by the image processing apparatus 10. Thereby, even in a case where execution of a macro or calling of the set contents has been carried out, which a person editing the page data is not aware of, it is possible to prevent contradiction from occurring between the display contents on a page and the set contents of the image processing apparatus 10. Further, even in a case where it is directed to display a GUI using page data in such a state that setting which a person editing the page data does not intend has been carried out, it is possible to prevent a contradiction from occurring between the display contents on a page and the set contents of the image processing apparatus 10.

Specific configurations, specific process contents, specific contents to be displayed on a page, a specific usage of a page, a specific form of data, and so forth, are not limited to those of the embodiment described above.

For example, as a value of a type attribute, any other value than those described above may be used. Further, the contents of priority setting information which is registered for an option in a case where a value of a display attribute of the option is changed, according to a selected or non-selected state of the option and a value of a type attribute of a selection operating part including the option, and how to change the type attribute, may be changed appropriately according to user's needs.

Further, in the above-described embodiment, a priority setting information table is provided for page data of one page. However, it is also possible to provide one priority setting information table for page data of a set of pages which is regarded as a unit of replacing a GUI to be used in the image processing apparatus 10.

Further, there may be another embodiment of a screen editing apparatus which is used to edit a GUI which is used by an apparatus other than an image processing apparatus. For example, there may be an embodiment of a screen editing apparatus for editing an operating page to be displayed on a display device of various electronic apparatuses such as a network home electric appliance, an automatic vending machine, medical equipment, an electric power unit, an air conditioning system, a gas metering system, a water metering system, a watt-hour metering system, an automobile, an airplane, a multipurpose computer and so forth. Further, there may be an embodiment of an apparatus for displaying an operating page based on page data edited by means of such a screen editing apparatus.

Further, a specific configuration of an operating part is not limited to a button.

Further, an embodiment of a computer-readable information recording medium may also be provided for storing a program for causing a computer processor to control hardware, whereby a computer functions as the above-mentioned screen editing apparatus. As a result of the program being read in a RAM from the computer-readable information recording medium, and being executed by a CPU or the computer processor, the same effect as that of the above-mentioned embodiment can be provided. Further, the program may also be provided by means of downloading, other than by means of the computer-readable information recording medium.

Thus, according to the embodiment, when page data edited by means of the screen editing apparatus is used to operate an electronic apparatus or an image forming apparatus, it is possible to prevent a contradiction from occurring between the contents of a page displayed on the display device and the set contents, even in a case where the page to be displayed on the display device can be edited, and "being displayed" and "not being displayed" for an option to be displayed on the page can be changed.

Therefore, it is possible to provide such an editing environment that a page to be displayed on a display device can be easily customized.

The present invention is not limited to the specifically disclosed embodiments, and variations and modifications may be made without departing from the scope of the present invention.

The present application is based on Japanese priority application No. 2008-140776 filed May 29, 2008, the entire contents of which are hereby incorporated herein by reference.

What is claimed is:

1. A screen editing apparatus for editing contents of an operating page to be displayed on a display device, comprising:
   an attribute storing part configured to store,
      as data to prescribe a state of a selection operating part having a plurality of options, disposed on the operating page, a type attribute indicating a type of the selection operating part,
      a display attribute per option of the selection operating part, and
      priority setting information indicating contents of modification of a setting of a function of the display device corresponding to an option of the selection operating part,
   wherein the display attribute is a value indicating whether to display an operating part corresponding to each option of the selection operating part, and
   wherein the modification is carried out while the operating page is displayed in order to eliminate a contradiction between display contents of the operating page displayed on the display device and the setting of the function actually made in the display device;
   a selection state switching part configured to switch, in response to a user's operation, between a selected state and a non-selected state of an operating part corresponding to each option of the selection operating part disposed on the operating page;
   a display attribute changing part configured to change, in response to a user's operation, a value of the display attribute stored by the attribute storing part;
   a priority setting information registering part configured to determine, when a display attribute of an option of a selection operating part is changed in the operating page displayed on the display device, whether it is necessary to add new priority setting information indicating contents of the modification of the setting of the function of the display device corresponding to the option in order to eliminate a contradiction between the display contents of the changed operating page and the setting of the function of the option actually made in the display device based on a value of the type attribute of the selection operating part of the option, and a selected or non-selected state of the option, and to add the new priority setting information to the priority setting information in the attribute storing part only when it is determined to be necessary to add the new priority setting information; and
   a type attribute changing part configured to change, when a display attribute of an option of a selection operating part is changed in the operating page displayed on the display device, the type attribute of the selection operating part based on information stored in the attribute storing part.

2. The screen editing apparatus as claimed in claim 1, wherein:
   as a type attribute that defines a type of the selection operating part having a plurality of options each of which options has a display attribute, a toggle type and a non-display type can be set, the toggle type is a type in which, one operating part is displayed on the operating page and setting is received for a selected or non-selected state of one option in a toggle manner, and the non-display type is a type in which no operating part is displayed for the selection operating part, and in a case where, in the selection operating part having a type attribute of the toggle type, a value of a display attribute for any option is changed into a value of not being displayed, and also, the operating part corresponding to the option is in a non-selected state, the type attribute changing part changes the type attribute of the selection operating part having the option to the non-display type from the toggle type, and also, the priority setting information registering part registers information indicating that the option is to be changed as not being selected, as the new priority setting information.

3. The screen editing apparatus as claimed in claim 2, wherein:

as a type attribute, a feedback type can be set, and the feedback type is a type in which, on the operating page, contents of setting for setting item corresponding to the selection operating part are displayed, and in a case where, in the selection operating part having a type attribute of the toggle type, a value of a display attribute of any option is changed into a value of not being displayed, and also, the operating part corresponding to the option is in a selected state, the type attribute changing part changes the type attribute of the selection operating part having the option to the feedback type from the toggle type, and also, the priority setting information registering part registers information indicating that the option is to be changed as being selected, as the new priority setting information.

4. The screen editing apparatus as claimed in claim 1, wherein:

as a type attribute that defines a type of the selection operating part having a plurality of options each of which options has a display attribute, a selection type can be set, and the selection type is a type in which an operating part corresponding to each option of the selection operating part is displayed on the operating page, which option has a display attribute of being displayed, and also, the number of the operating parts which can be in selected states simultaneously is one at the maximum, the priority setting information registering part comprises a part configured to stop change of a display attribute, in a case where, in the selection operating part having a type attribute of the selection type, and having three or more options each having a display attribute of being displayed, operation is carried out to change a value of a display attribute of any option into a value of not being displayed, and also, an operating part corresponding to the option is in a selected state, and in a case where, in the selection operating part having a type attribute of the selection type, and having three or more options each having a display attribute of being displayed, operation is carried out to change a value of a display attribute of any option into a value of not being displayed, and also, an operating part corresponding to the option is in a non-selected state, the priority setting information registering part registers information indicating that the option is to be changed as not being selected, as the new priority setting information.

5. The screen editing apparatus as claimed in claim 4, wherein:

as a type attribute, a toggle type can be set, the toggle type is a type in which one operating part is displayed on the operating page, and the setting for a selected or non-selected state of one option is received in a toggle manner, and the priority setting information registering part comprises a part configured to stop change of a display attribute in a case where, in the selection operating part having a type attribute of the selection type, and having two options each having a display attribute of being displayed, an operation is carried out to change a value of a display attribute of any option into a value of not being displayed, and also, an operating part corresponding to the option is in a selected state, and in a case where, in the selection operating part having a type attribute of the selection type, and having two options each having a display attribute of being displayed, an operation is carried out to change a value of a display attribute of any option into a value of not being displayed, and also, an operating part corresponding to the option is in a non-selected state, the type attribute changing part changes the type attribute of the selection operating part having the option to the toggle type from the selection type, and also, the priority setting information registering part registers information indicating that the option is to be changed as not being selected, as the new priority setting information.

6. The screen editing apparatus as claimed in claim 1, wherein:

as a type attribute that defines a type of the selection operating part having a plurality of options each of which options has a display attribute, a one being selected type can be set, and the one being selected type is a type in which, an operating part corresponding to each option of the selection operating part is displayed on the operating page, which option has a display attribute of being displayed, and also, any one operating part is in a selected state, and the priority setting information registering part comprises a part configured to stop a change of a value of a display attribute in a case where, in the selection operating part having a type attribute of the one being selected type and having three or more options each having a display attribute of being displayed, an operation is carried out to change a value of a display attribute of any option into a value of not being displayed, and also, an operating part corresponding to the option is in a selected state, and the priority information registering part comprises a part configured to register information indicating that an option which is in a selected state in the selection operating part is to be changed as being selected, as the new priority setting information, in a case where, in the selection operating part having a type attribute of the one being selected type, and having three or more options each having a display attribute of being displayed, an operation is carried out to change a value of a display attribute of any option into a value of not being displayed, and also, an operating part corresponding to the option is in a non-selected state.

7. The screen editing apparatus as claimed in claim 6, wherein:

as a type attribute, a feedback type can be set, and the feedback type is a type in which, on the operating page, the contents of setting for a setting item corresponding to the selection operating part are displayed, and in a case where, in the selection operating part having a type attribute of the one being selected type and having two options each having a display attribute of being displayed, a value of a display attribute of any option is changed into a value of not being displayed, the type attribute changing part changes the type attribute of the selection operating part having the option to the feedback type from the one being selected type, and also, the priority setting information registering part registers information indicating that an option, which is in a selected state in the selection operating part, is to be changed as being selected, as the new priority setting information.

8. A screen editing method for editing contents of an operating page to be displayed on a display device, comprising:

a computer processor storing in an attribute storing part, as data to prescribe a state of a selection operating part having a plurality of options, disposed on the operating page, a type attribute indicating a type of the selection operating part, a display attribute per option of the selection operating part, and priority setting information indicating contents of modification of a setting of a function of the display device corresponding to an option of the selection operating part, wherein the display attribute is a value indicating whether to display an operating part corresponding to each option of the selection operating part, and wherein the modification is carried out while the operating page is displayed in order to eliminate a contradiction between display contents of the operating page displayed on the display device and the setting of the function actually made in the display device;

the computer processor switching, in response to a user's operation, between a selected state and a non-selected state of an operating part corresponding to each option of the selection operating part disposed on the operating page;

the computer processor changing, in response to a user's operation, a value of a display attribute having been stored by the computer;

the computer processor determining, when a display attribute of an option of a selection operating part is changed in the operating page displayed on the display device, whether it is necessary to add new priority setting information indicating contents of the modification of the setting of the function of the display device corresponding to the option in order to eliminate a contradiction between the display contents of the changed operating page and the setting of the function of the option actually made in the display device based on a value of the type attribute of the selection operating part of the option, and a selected or non-selected state of the option, and to add the new priority setting information to the priority setting information in the attribute storing part only when it is determined to be necessary to add the new priority setting information; and the computer processor changing, when a display attribute of an option of a selection operating part is changed in the operating page displayed on the display device, the type attribute of the selection operating part based on information stored in the attribute storing part.

9. A non-transitory computer-readable information recording medium storing a screen editing program which, when executed by a computer processor, performs a screen editing method, the method comprising:

storing in an attribute storing part, as data to prescribe a state of a selection operating part having a plurality of options, disposed on an operating page, a type attribute indicating a type of the selection operating part, a display attribute per option of the selection operating part, and priority setting information indicating contents of modification of a setting of a function of the display device corresponding to an option of the selection operating part, wherein the display attribute is a value indicating whether to display an operating part corresponding to each option of the selection operating part, and wherein the modification is carried out while the operating page is displayed in order to eliminate a contradiction between display contents of the operating page displayed on the display device and the setting of the function actually made in the display device;

switching, in response to a user's operation, between a selected state and a non-selected state of an operating part corresponding to each option of the selection operating part disposed on the operating page;

changing, in response to a user's operation, a value of a display attribute having been stored;

determining, when a display attribute of an option of a selection operating part is changed in the operating page displayed on the display device, whether it is necessary to add new priority setting information indicating contents of the modification of the setting of the function of the display device corresponding to the option in order to eliminate a contradiction between the display contents of the changed operating page and the setting of the function of the option actually made in the display device based on a value of the type attribute of the selection operating part of the option, and a selected or non-selected state of the option, and to add the new priority setting information to the priority setting information in the attribute storing part only when it is determined to be necessary to add the new priority setting information; and changing, when a display attribute of an option of a selection operating part is changed in the operating page displayed on the display device, the type attribute of the selection operating part based on information stored in the attribute storing part.

10. The screen editing apparatus as claimed in claim 1, wherein:

when the display attribute of the option of the selection operating part is changed in the operating page displayed on the display device, the type attribute changing part is configured to determine whether it is necessary to change the type attribute of the selection operating part based on the current type attribute of the selection operating part and a selected or non-selected state of the option, and to change the type attribute of the selection operating part corresponding to the current type attribute of the selection operating part and the selected or non-selected state of the option when it is determined to be necessary to change the type attribute of the selection operating part.

11. The screen editing method as claimed in claim 8, wherein:

when the display attribute of the option of the selection operating part is changed in the operating page displayed on the display device, the computer processor determining whether it is necessary to change the type attribute of the selection operating part based on the current type attribute of the selection operating part and a selected or non-selected state of the option, and changing the type attribute of the selection operating part corresponding to the current type attribute of the selection operating part and the selected or non-selected state of the option when it is determined to be necessary to change the type attribute of the selection operating part.

12. The non-transitory computer-readable information recording medium as claimed in claim 9, wherein:
the changing including, when the display attribute of the option of the selection operating part is changed in the operating page displayed on the display device,
determining whether it is necessary to change the type attribute of the selection operating part based on the current type attribute of the selection operating part and a selected or non-selected state of the option, and
changing the type attribute of the selection operating part corresponding to the current type attribute of the selection operating part and the selected or non-selected state of the option when it is determined to be necessary to change the type attribute of the selection operating part.

\* \* \* \* \*